United States Patent
Kim et al.

(10) Patent No.: US 9,210,359 B2
(45) Date of Patent: Dec. 8, 2015

(54) DISPLAY DEVICE, REMOTE CONTROL DEVICE TO CONTROL DISPLAY DEVICE, METHOD OF CONTROLLING DISPLAY DEVICE, METHOD OF CONTROLLING SERVER AND METHOD OF CONTROLLING REMOTE CONTROL DEVICE

(71) Applicant: Samsung Electronics Co., Ltd., Suwon-si (KR)

(72) Inventors: In Ji Kim, Yongin-si (KR); Yong Hoon Lee, Yongin-si (KR); Snag On Choi, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/055,130

(22) Filed: Oct. 16, 2013

(65) Prior Publication Data
US 2014/0111690 A1    Apr. 24, 2014

(30) Foreign Application Priority Data
Oct. 19, 2012 (KR) .................... 10-2012-0116955

(51) Int. Cl.
*H04N 5/44* (2011.01)
*G06F 3/01* (2006.01)
(Continued)

(52) U.S. Cl.
CPC .............. *H04N 5/4403* (2013.01); *G06F 3/017* (2013.01); *H04N 5/45* (2013.01); *H04N 21/4223* (2013.01); *H04N 21/42201* (2013.01); *H04N 21/42202* (2013.01); *H04N 21/42203* (2013.01)

(58) Field of Classification Search
USPC ........... 348/734, 564, 565, 725, 14.01, 14.02, 348/14.05; 725/10, 34, 12
IPC ................................ H04N 5/44,5/45
See application file for complete search history.

(56) References Cited

U.S. PATENT DOCUMENTS 8,381,238 B2 * 2/2013 Sano et al. ....................... 725/12
8,704,760 B2 * 4/2014 Kang et al. ..................... 345/156
(Continued)

FOREIGN PATENT DOCUMENTS

| EP | 2256590 A1 | 12/2010 |
|---|---|---|
| JP | 07-288875 | 10/1995 |

(Continued)

OTHER PUBLICATIONS

International Search Report dated Feb. 28, 2014 in International Patent Application No. PCT/KR2013/009342.
(Continued)

*Primary Examiner* — Trang U Tran
(74) *Attorney, Agent, or Firm* — Staas & Halsey LLP

(57) ABSTRACT

A display device, a remote control device for the display device, a method of controlling the display device, a method of controlling the remote control device, and a method of controlling a server includes collecting at least one piece of situation information or receiving at least one piece of situation information from a remote control device, determining a current state of a user based on the collected or received at least one piece of situation information, instructing the remote control device to output a notification signal corresponding to the current state of the user, and generating the control command according to the current state of the user and providing a sense-based image service to the user according to the control command.

13 Claims, 16 Drawing Sheets

(51) Int. Cl.
*H04N 5/45* (2011.01)
*H04N 21/422* (2011.01)
*H04N 21/4223* (2011.01)

(56) References Cited

U.S. PATENT DOCUMENTS

2002/0062481 A1 5/2002 Slaney et al.
2010/0169905 A1* 7/2010 Fukuchi et al. ................. 725/10
2011/0193774 A1 8/2011 Nakade et al.
2011/0249107 A1 10/2011 Chiu
2011/0258660 A1 10/2011 Thomas et al.
2012/0066705 A1 3/2012 Harada et al.
2013/0132199 A1* 5/2013 Croy .......................... 705/14.54

FOREIGN PATENT DOCUMENTS

KR 10-2007-0090645 9/2007
WO 2010/020924 A1 2/2010

OTHER PUBLICATIONS

Extended European Search Report issued Jan. 29, 2014 in European Patent Application No. 13189108.7.

* cited by examiner

FIG. 1
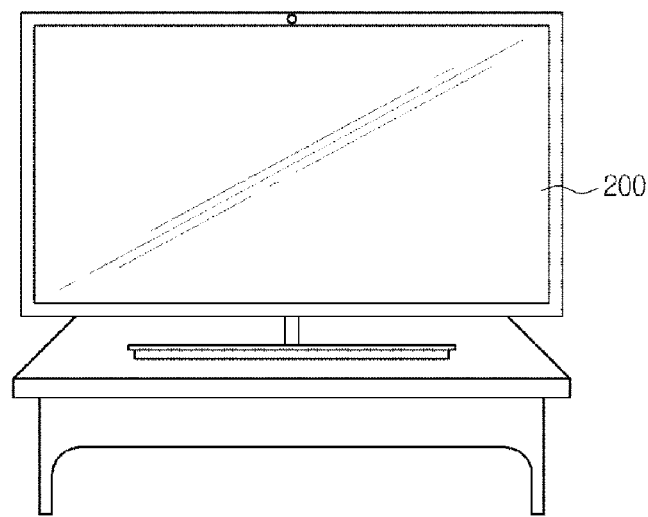
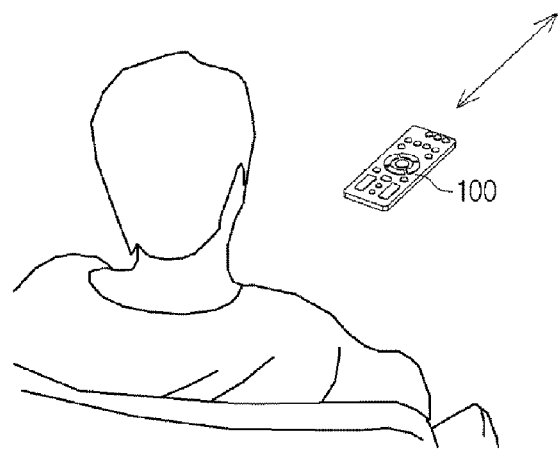

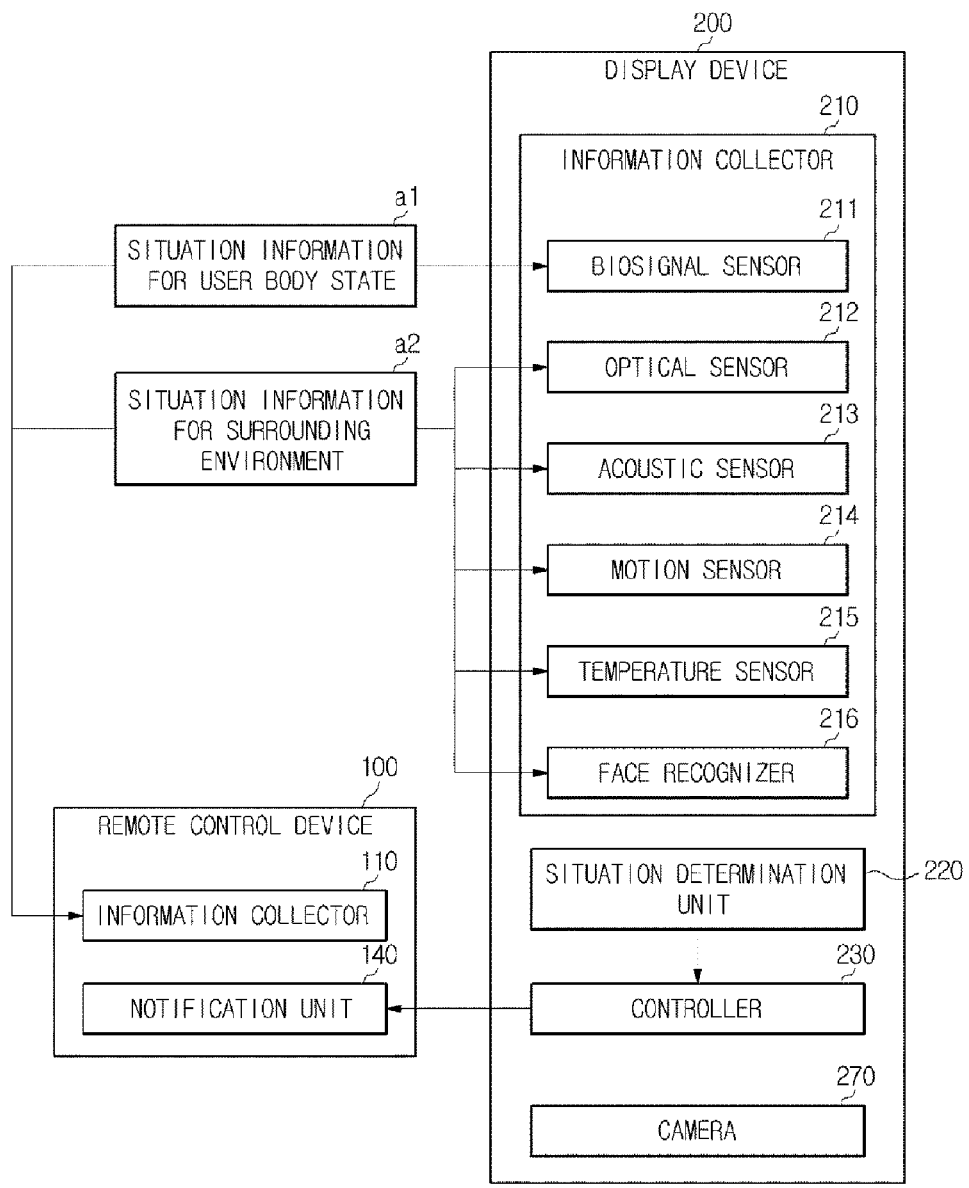

DISPLAY DEVICE, REMOTE CONTROL DEVICE TO CONTROL DISPLAY DEVICE, METHOD OF CONTROLLING DISPLAY DEVICE, METHOD OF CONTROLLING SERVER AND METHOD OF CONTROLLING REMOTE CONTROL DEVICE

CROSS-REFERENCE TO RELATED APPLICATIONS

This application claims the priority benefit of Korean Patent Application No. 10-2012-0116955, filed on Oct. 19, 2012 in the Korean Intellectual Property Office, the disclosure of which is incorporated herein by reference.

BACKGROUND

1. Field

The following description relates to a display device, a remote control device for the display device, a method of controlling the display device, a method of controlling the remote control device, and a method of controlling a server.

2. Description of the Related Art

A display device is an output device for representing electrical signals as visual information and displaying the visual information to a user, and may include a television (TV), a computer monitor, and various mobile devices such as a smartphone, a tablet computer, etc.

A remote control device controls a display device from a distance. A user may view video content using a display device at a close distance where the user may easily manipulate the display device or at a distance where the user necessarily moves in order to manipulate the display device. The remote control device may enable the user to manipulate the display device from a distance.

Examples of the remote control device include a remote controller. The remote controller emits infrared light having a predetermined frequency to a display device 200. The display device receives the infrared light, converts the infrared light into an electrical signal according to the frequency of the infrared light, sends the electrical signal to a processor, and performs various operations such as channel change or volume control of the display device.

Recently, various terminals having a wireless communication function, such as a smartphone, may be used as a remote control device. In this case, the remote control device or the display device includes a wireless communication module to transmit and receive an electrical signal over a wireless communication network according to various mobile communication standards such as Bluetooth, Wi-Fi, 3GPP, 3GPP2, or WiMax. A remote control device such as a smartphone generates a predetermined signal according to user touch and transmits the predetermined signal to a display device, and the display device generates a control command according to the predetermined signal and performs channel change or volume control according to the control command.

SUMMARY

Therefore, it is an aspect of the present disclosure to control a display device based on a current state of a person or an environment, such as feelings or actions of a user who uses a display device to display an image, such as a TV, or surrounding environments.

It is an aspect of the present disclosure to provide various sense-based services to a user by controlling a display device based on a current state of a user.

It is an aspect of the present disclosure to enable a remote control device or a display device to acquire state information to determine body states or feelings of a user from external environments and to appropriately check body states or feelings of the user.

It is an aspect of the present disclosure to provide various services using a display device based on feelings or actions of a user, to stimulate the user' senses, and to enable the user to undergo user's experience (UX) to expand emotional experience of the user.

It is an aspect of the present disclosure to determine a user state and to further acquire information about surrounding environments based on the user state or to provide a predetermined service or a service using the further acquired information to the user based on the user state.

It is an aspect of the present disclosure to enable a user to feel positive emotions, pleasure and impressions by arousing interest and curiosity of the user who uses a display device.

It is an aspect of the present disclosure to provide content or services suitable for a user according to habits, patterns, and preference of a user when the user views a display device or when the user is located near the display device.

It is an aspect of the present disclosure to provide a display device including a self-learning function by updating content or services for stimulating sense according to user's reaction or preference.

Additional aspects of the disclosure will be set forth in part in the description which follows and, in part, will be obvious from the description, or may be learned by practice of the invention.

In accordance with an aspect of the present disclosure, a display device includes a situation determination unit to determine a current state of a user based on at least one piece of situation information received from a remote control device or collected by an information collector, and a controller to instruct the remote control device to output a notification signal corresponding to the current state of the user and to generate control information to provide a sense-based image service to the user according to the current state of the user. The remote control device outputs the notification signal through a notification unit.

The display device may further include a determination information database to store determination information to determine the current state of the user based on the situation information. In this case, the situation determination unit may search the determination information database for determination information corresponding to the situation information and determine the current state of the user based on the determination information corresponding to the situation information if the determination information corresponding to the situation information is present.

The display device may further include a control information database including control information of the remote control device or the display device corresponding to the current state of the user. In this case, the controller may detect the control information of the display device corresponding to the current state of the user by referring to the control information database and control the display device according to the detected control information.

The controller of the display device may receive a user command from the user through the remote control device according to the notification signal, correct the generated control information according to the user command, and generate new control information.

In this case, the display device may further include a memory to store the new control information generated by the controller, and an update unit to analyze a user manipulation pattern based on the stored control information and to update the control information database based on the analyzed result.

The information collector may include at least one of an optical sensor to sense light, an acoustic sensor to sense sound, a motion sensor to sense motion, a temperature sensor to sense a temperature, and a biosignal sensor to sense temperature, pulse, respiratory rate, or heart rate of a person. The information collector may include a face recognizer to detect a face shape from an image, to detect feature points of a face from the detected face shape, to analyze the positions of the feature points of the face, to generate face information and facial expression information, and to collect situation information.

The notification unit may include at least one of a light emitting module to emit light, a vibration generation module to generate vibrations and an acoustic output module to output sound.

The control information to control the display device may control a camera of the display device to capture an image, control the image captured by the camera of the display device to be displayed on the display device in a picture-in-picture (PIP) manner, control a thumbnail image of at least one image captured by the camera of the display device to be displayed on a screen of the display device, or control information about an image displayed on the screen of the display device to be displayed on the screen of the display device.

The display device may further include a beam projector module to project an image onto an external projection surface.

The situation determination unit may aggregate situation information and image information of an image played back by the display device and determine the current state of the user.

In accordance with an aspect of the present disclosure, a remote control device to control a display device includes an image collector to collect at least one piece of situation information, a situation determination unit to determine a current state of a user based on the at least one piece of situation information collected by the information collector, a notification unit to output a notification signal corresponding to the determined current state of the user, and a controller to generate control information to enable the display device to provide a sense-based image service to a user according to the current state of the user and to transmit the control information to the display device, after the notification signal is output.

The remote control device may further include a determination information database to store determination information to determine the current state of the user based on the situation information indicating features of a special situation of an external environment. At this time, the situation determination unit may search the determination information database for determination information corresponding to the collected situation information and determine the current state of the user based on the determination information corresponding to the situation information if the determination information corresponding to the situation information is present.

The remote control device may further include a control information database including display control information corresponding to the current state of the user; and a controller to detect the control information of the display device corresponding to the current state of the user by referring to the control information database.

The remote control device may further include a command input unit to receive a display manipulation command from the user after the notification signal is output.

The controller of the remote control device may detect the control information of the display device corresponding to the current state of the user by referring to the control information database and correct the generated control information according to the user command received through the command input unit, and the remote control device may further include a memory to store the control information generated by the controller, and an update unit to analyze a user manipulation pattern based on the stored control information and to update the control information database based on the analyzed result.

The information collector may include at least one of an optical sensor to sense light, an acoustic sensor to sense sound, a motion sensor to sense motion, a temperature sensor to sense a temperature, a biosignal sensor to sense temperature, pulse, respiratory rate, or heart rate of a person, and a motion recognition sensor to motion of the remote control device. The information collector may include a face recognizer to detect a face shape from an image, to detect feature points of a face from the detected face shape, to analyze the positions of the feature points of the face, to generate face information and facial expression information, and to collect situation information.

The notification unit may include at least one of a light emitting module to emit light, a vibration generation module to generate vibrations, and an acoustic output module to output sound.

The situation determination unit of the remote control device may determine the current state of the user based on the at least one piece of situation information and image information of an image played back by the display device.

In accordance with an aspect of the present disclosure, a remote control device includes an image collector to collect at least one piece of situation information, and a notification unit to output a notification signal. In this case, the remote control device transmits the situation information collected by the information collector to a display device or a server, receives information about a current state of a user determined based on the collected situation information from the display device or the server, and sends control information corresponding to the determined current state of the user or the collected situation information after the notification unit outputs the notification signal to control the display device.

The remote control device may further include a command input unit to receive a display manipulation command from the user after the notification signal is output and transmitting the display manipulation command to the display device.

The information collector of the remote control device includes at least one of an optical sensor to sense light, an acoustic sensor to sense sound, a motion sensor to sense motion, a temperature sensor to sense a temperature, and a biosignal sensor to sense temperature, pulse, respiratory rate or heart rate of a person. The information collector may include a face recognizer to detect a face shape from an image, to detect feature points of a face from the detected face shape, to analyze the positions of the feature points of the face, to generate face information and facial expression information, and to collect situation information.

The notification unit may include at least one of a light emitting module to emit light, a vibration generation module to generate vibrations, and an acoustic output module to output sound.

The situation determination unit may determine the current state of the user based on the situation information and image information of an image played back by the display device.

In accordance with an aspect of the present disclosure, a method of controlling a display device includes collecting at least one piece of situation information or receiving at least one piece of situation information from a remote control device, determining a current state of a user based on the collected or received at least one piece of situation information, instructing the remote control device to output a notification signal corresponding to the current state of the user, and generating a control command according to the current state of the user and providing a sense-based image service to the user according to the control command.

The situation information may be collected by sensing light and measuring the amount of light, measuring the volume of sound, sensing motion, measuring a temperature, measuring a pulse or temperature of a person, or measuring time information received from a satellite or a controller.

The collecting the situation information may include detecting a face shape from an image, detecting feature points of a face from the detected face shape, and analyzing the positions of the feature points of the face, and collecting the situation information including face information and facial expression information of the image.

The determining the current state of the user may include searching a determination information database including determination information to determine the current state of the user based on the situation information, and comparing the collected situation information with the determination information of the determination information database and determining the current state of the user from the determination information if the determination information corresponding to the collected situation information is present.

The sense-based image service may be provided by capturing an image using a camera of the display device, displaying the image captured by the camera of the display device on the display device in a picture-in-picture (PIP) manner, displaying a thumbnail image of at least one image captured by the camera of the display device on a screen of the display device, displaying information about an image displayed on the screen of the display device on the screen of the display device, or enabling a beam projector module of the display device to project an image onto a projection surface.

The generating the control command according to the current state of the user may include searching a control information database including control information of the display device corresponding to the current state of the user, detecting the control information of the display device corresponding to the current state of the user, and generating the control command according to the control information.

The determining the current state of the user may include determining the current state of the user based on the situation information and information about an image played back by the display device.

In accordance with an aspect of the present disclosure, a method of controlling a display device includes collecting at least one piece of situation information or receiving at least one piece of situation information from a remote control device, determining a current state of a user based on the collected or received at least one piece of situation information, instructing the remote control device to output a notification signal corresponding to the current state of the user, and receiving a user command from the user according to the notification signal output from the remote control device and providing a sense-based image service to the user according to the collected or received situation information and the control command.

In accordance with an aspect of the present disclosure, a method of controlling a server includes, at a server, receiving at least one piece of situation information from the display device or a remote control device, determining a current state of a user based on the received situation information, instructing the remote control device to output a notification signal corresponding to the current state of the user, and transmitting a control command to provide a sense-based image service to the user according to the current state of the user and enabling the display device to provide the sense-based image service to the user according to the control command.

In accordance with an aspect of the present disclosure, a method of controlling a remote control device includes collecting at least one piece of situation information, determining a current state of a user based on the collected situation information, outputting a notification signal corresponding to the current state of the user, receiving a user command from the user according to the notification signal output from the remote control device, and generating a control command of a display device based on the collected situation information and the user command, transmitting the control command to the display device and enabling the display device to provide a sense-based image service to the user according to the control command.

In accordance with an aspect of the present disclosure, a method of controlling a remote control device includes collecting at least one piece of situation information, determining a current state of a user based on the collected situation information, outputting a notification signal corresponding to the current state of the user, and generating a control command of a display device based on the collected situation information, transmitting the control command to the display device and enabling the display device to provide a sense-based image service to the user according to the control command.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a diagram showing a display device control system including a display device and a remote control device to control the display device according to an embodiment of the present disclosure;

FIG. 3 is a block diagram showing an information collector of a display device according to an embodiment of the present disclosure;

DETAILED DESCRIPTION

Figure 2:
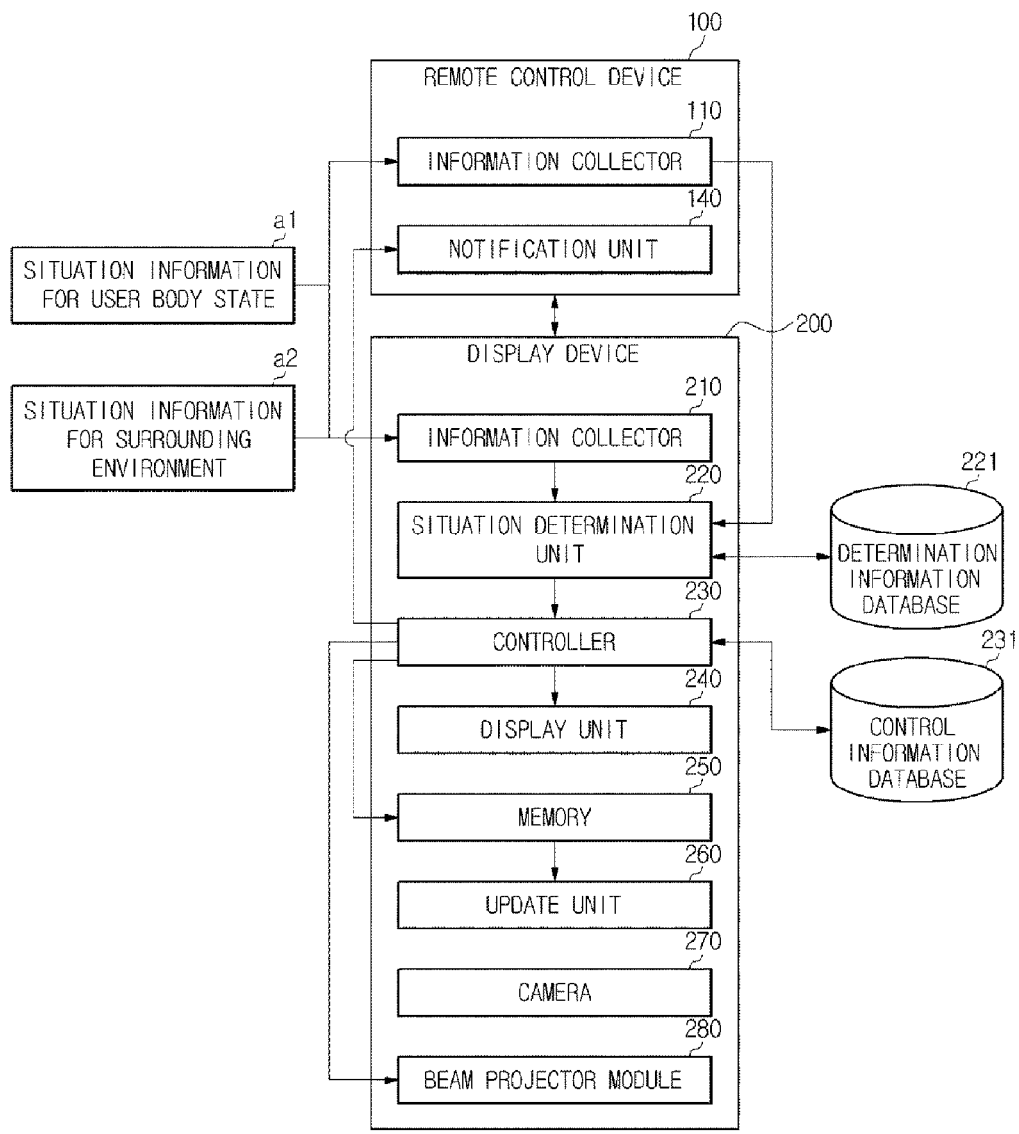
FIG. 2 is a block diagram showing a display device and a remote control device according to an embodiment of the present disclosure.

Reference will now be made in detail to the embodiments, examples of which are illustrated in the accompanying drawings, wherein like reference numerals refer to the like elements throughout. The embodiments are described below to explain the present disclosure by referring to the figures.

Hereinafter, a display device and a remote control device to control the display device according to an embodiment of the present disclosure will be described with reference to FIGS. 1 to 6.

FIG. 1 is a diagram showing a display device control system including a display device and a remote control device to control the display device according to an embodiment of the present disclosure.

The display device control system of the embodiment of the present disclosure includes a remote control device 100 and a display device 200 which may be controlled by the remote control device 100. The remote control device 100 and the display device 200 may transmit and receive a command or data to and from each other over a wireless communication network using various mobile communication standards such as Bluetooth, Wi-Fi, or 3GPP, 3GPP2, or WiMax.

The remote control device 100 may remotely control the display device 200, e.g., a TV.

In an embodiment of the present disclosure, the remote control device 100 is a remote controller which has predetermined buttons formed on one surface or multiple surfaces thereof and emits infrared light having a predetermined frequency to the display device 200 to control the display device 200 according to a button manipulated by a user.

According to an embodiment of the present disclosure, the remote control device 100 may be a terminal including a wireless communication module, which has a touchscreen or predetermined buttons formed on an outer surface thereof, generates a predetermined control signal according to manipulation of a physical button or the touchscreen by a user, sends the generated control signal to the display device 200 over various wireless communication networks, and controls the display device 200, such as a remote controller including a wireless communication module or a smartphone.

All kinds of remote control devices to control the display device 200 at a predetermined distance may be used as the remote control device 100 of the embodiment of the present disclosure.

In an embodiment of the present disclosure, the display device 200 may output an image or an image and sound to provide video and/or audio content to a user.

The display device 200 may include an infrared reception unit to receive infrared light emitted from the remote control device 100 to be controlled by the remote control device 100 or a transmission unit to transmit a predetermined control command from the remote control device 100, such as a radio communication chip, according to embodiments of the present disclosure.

Various display devices which may be controlled by the remote control device 100 may be included in an embodiment of the present disclosure. For example, the display device 200 may be a TV or various implementations of an electronic image display device, e.g., a refrigerator display mounted in a housing of a refrigerator. In addition, examples of the display device include home appliances to display an image through a screen, e.g., a computer, a game console, a smartphone, etc. A beam projector module to project light such as laser beams onto a projection surface and to display an image and a screen may be included in the display device according to the embodiments of the present disclosure.

According to an embodiment of the present disclosure, external situation information is collected using the remote control device 100 and the display device 200, the current state of a user or a surrounding environment is checked based on the collected information, and a control command of the display device 200 is generated based on the checked current state to control the display device 200. According to an embodiment of the present disclosure, the control command of the remote control device may be controlled.

Hereinafter, an embodiment of a system including the remote control device 100 and the display device 200 will be described with reference to FIG. 2.

FIG. 2 is a block diagram showing a display device control system including a remote control device according to an embodiment of the present disclosure.

Referring to FIG. 2, the remote control device 100 according to the embodiment of the present disclosure includes, for example, an information collector 110 to collect situation information from an external environment using various kinds of sensors and a notification unit 140 to output light or sound and notify a user of the situation information. Hereinafter, the information collector 110 of the remote control device 100 is referred to as a first information collector 110 in order to be distinguished from an information collector 210 of the display device 200.

The display device 200 may include a situation determination unit 220 (hereinafter, the situation determination unit of the display device 200 is referred to as a second situation determination unit in order to be distinguished from a situation determination unit 120 of the remote control device 100) to determine the current state of the user based on the external situation information collected by the first information collector 110 of the remote control device 100 and a controller 230 (hereinafter, the controller of the display device 200 is referred to as a second controller in order to be distinguished from a controller 130 of the remote control device 100) to transmit the determination result of the second situation determination unit 220 to the remote control device 100 or generate a control command according to the determination result and to control the display device 200.

According to an embodiment of the present disclosure, the display device 200 may further include an information collector 210 (hereinafter, referred to as a second information collector in order to be distinguished from the first information collector of the remote control device 100) to collect situation information from an external environment. In this case, the second situation determination unit 220 determines a situation using the situation information collected using the second information collector 210 of the display device 200 or determines the current state using the collected situation information from the information collectors 110 and 210 of the remote control device 100 and the display device 200.

In the embodiment of the present disclosure, as shown in FIG. 2, the display device 200 may include a determination information database 221 in which information for determination of the external situation of the second situation determination unit 220 is stored or a control information database 231 in which information for generation of the control command of the display device 200 by the second controller 230 is stored. According to the embodiment, the display device 200 may be connected to an external determination information database 221 or control information database 231 over a wired/wireless communication network.

According to the embodiment, the display device 200 may further include a display unit 240 to display a variety of audio/video content to a user, a memory 250 to store the information collected by the second information collector 210, the control command of the controller 230 or image data captured by a camera 270 mounted on a front surface, a side surface, or a rear surface of the display device 200, and an update unit 260 to analyze a manipulation pattern of the user based on the stored information and to learn the analyzed result.

As shown in FIG. 2, according to the embodiment, the display device 200 may further include a camera module 270 mounted in the display device 200 to capture an image or a projector module 280 to project beams to an external projection surface and to display an image on the projection surface.

Accordingly, in the display device control system including the display device and the remote controller of the present disclosure, the situation information collected by the information collector 110 or 210 of the remote control device 100 or the display device 200 is transmitted to the display device 200 and the display device 200 determines the situation based on the collected situation information, generates a control command corresponding thereto, and controls the display device 200.

Figure 4A:
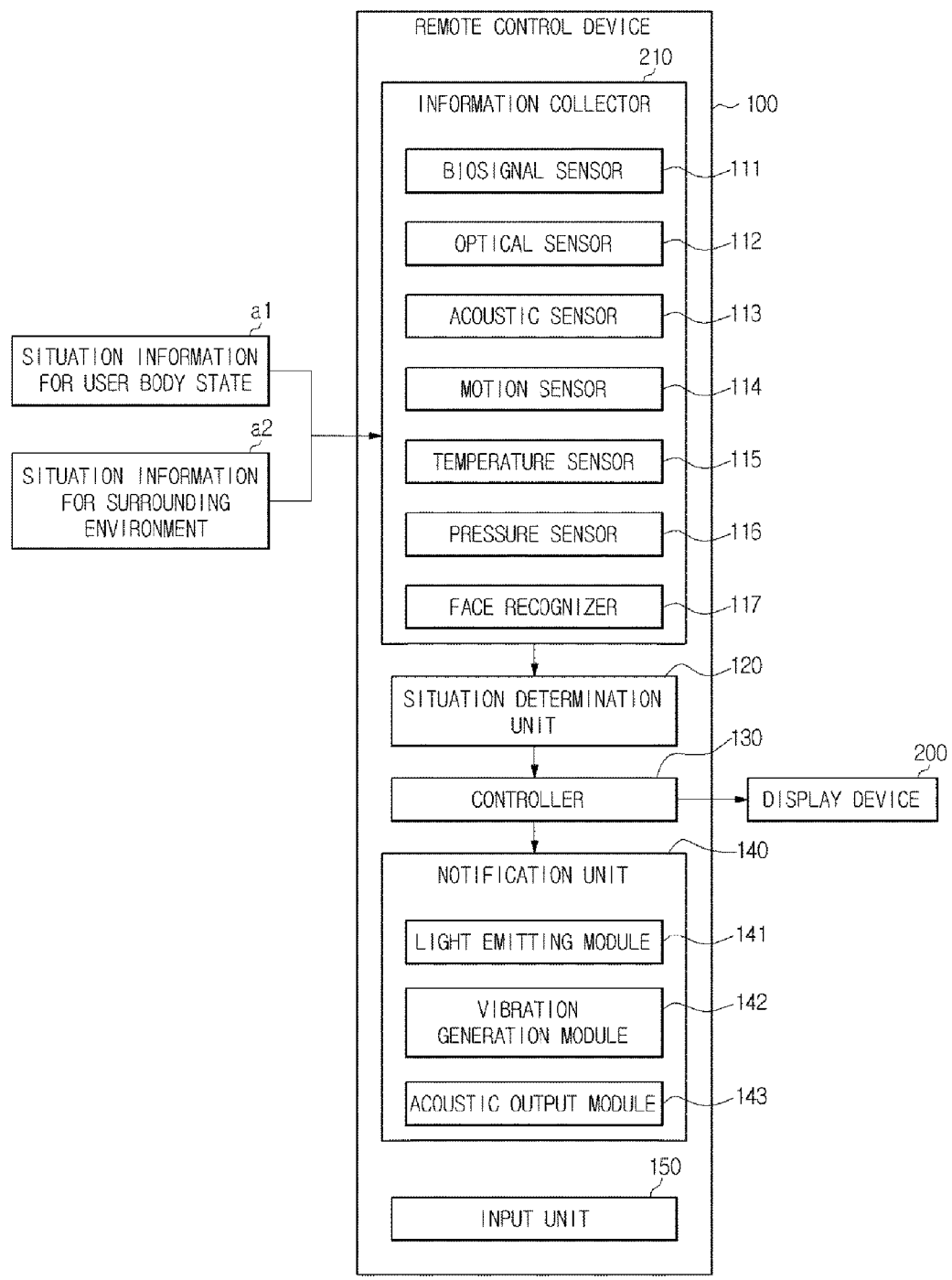
FIG. 4A is a block diagram of a remote control device according to an embodiment of the present disclosure.

According to an embodiment, as shown in FIG. 4A, the situation determination unit 120 to determine the situation information and the controller 130 to generate the control command are included in the remote control device 100 to determine the situation and generate the control command.

Hereinafter, as shown in FIG. 2, components will be described in the embodiment in which the situation determination unit 220 and the controller 230 are included in the display device 200.

First, the information collectors 110 and 210 to collect the situation information in the embodiment of the present disclosure will be described with reference to FIGS. 3 and 4A.

In the embodiment of the present disclosure, the information collectors 110 and 210, that is, the first information collector 110 and/or the second information collector 210, collect the situation information of the external environment, that is, situation information a1 of a user body state or situation information a2 of a surrounding environment.

More specifically, various conditions of the external environment, for example, light, sound, temperature, or motion are sensed and converted into digital data, information from an external device, such as a global positioning system (GPS) received via communication with a satellite, is received, or information about a played-back program is received over a wired/wireless communication network, thereby acquiring a variety of situation information.

The situation information a1 of the user body state includes a variety of information indicating the user body state, such as pulse, respiratory rate, or temperature, for example.

The situation information a2 of the surrounding environment includes information about various surrounding environments or a played-back program, such as the amount of light, ambient sound, the number of persons around the device, information about a program played back by the display device 200, time information, etc.

The information collectors 110 and 210 of the embodiment of the present disclosure may be included in only one of the remote control device 100 or the display device 200, or may be included in both the remote control device 100 and the display device 200.

The information collectors 110 and 210 may be designed to be randomly arranged at an arbitrary position of the remote control device 100 or the display device 200 or at an optimal position to sense the surrounding environments, the situation information of which will be acquired, such as light, sound, vibrations, or various biosignals.

According to the embodiment of the present disclosure, the information collectors 110 and 220 may be designed such that the user recognizes a presence/absence of the sensor.

According to an embodiment of the present disclosure, as shown in FIGS. 3 and 4A, the first information collector 110 of the remote control device or the second information collector 210 of the display device 200 may include at least one of biosignal sensors 111 and 211, optical sensors 112 and 212, acoustic sensors 113 and 213, motion sensors 114 and 214, temperature sensors 115 and 215, and face recognizers 117 and 216, and may further include an information collector such as a sensor which is not described or shown, as necessary.

The biosignal sensors 111 and 211 sense the user body state and collect the situation information a1 of the user body state.

Here, the situation information a1 of the user body state refers to information about the body state of a person, e.g., a viewer who views the display device. In other words, the situation information a1 of the user body state refers to a variety of information indicating whether the user sleeps, is tired, or is excited.

More specifically, the situation information a1 of the user body state may include, for example, biological information such as temperature, pulse, respiratory rate, neural oscillation, or heart rate.

The biosignal sensors 111 and 211 collect the situation information a1 of the user body state. The biosignal sensors 111 and 211 are generally mounted in the remote control device 100 located near the user to easily and accurately measure the biosignal of the user.

In this case, the biosignal sensor 111 may be mounted at an arbitrary position of the remote control device 100 or at an optimal position to sense the biosignal.

According to an embodiment of the present disclosure, the biosignal sensors 111 and 211 may be a heat sensor mounted at a specific position of the remote control device 100, for example, in a grip of the remote control device 100, to measure the temperature of a person or a pulse sensor mounted in a portion of the user body, for example, an end of a finger of a person, to measure the pulse of the person.

The biosignal sensors 111 and 211 may be mounted in the display device 100 according to the situation information a1 of the user body state to be acquired, as shown in FIG. 2.

The optical sensors 112 and 212 sense light and collect the situation information a2 of the surrounding environment.

The information a2 of the surrounding environment refers to various environment conditions around the remote control device 100 or the display device 200, for example, presence of light, the amount of light, presence and volume of sound, and presence and motion of an external object.

The optical sensors 112 and 212 sense light in the surrounding environment to measure the amount of light or sense a presence of an external object, motion or shape of the object, convert the sensed result into an electrical signal, and acquire the situation information a2 of the surrounding environment. For the optical sensors 112 and 212, a photodiode or a phototransistor to convert light into an electrical signal may be used or an infrared light emitting diode to convert infrared light into an electrical signal may be used.

According to the embodiment of the present disclosure, the optical sensors 112 and 212 may further include a light emitting module to irradiate visible light or infrared light toward a target such that the optical sensors 112 and 212 receive light reflected from the target and detect the target.

The acoustic sensors 113 and 213 sense and measure voice or sound around the display device 200 and acquire the situation information a2 of the surrounding environment.

The acoustic sensors 113 and 213 sense a sound wave having a predetermined frequency delivered via air using a transducer, such as audible sound, and convert the sound into an electrical signal, thereby acquiring the situation information a2 of a variety of voice or sound of the surrounding environment, such as voice of persons.

Examples of the acoustic sensors 113 and 213 include a microphone.

The motion sensors 114 and 214 sense movement of the device. For example, the motion sensors 114 and 214 sense movement of the remote control device 100 or the display device 200 in which the motion sensor 114 or 214 is mounted and convert the sensed result into an electrical signal.

For the motion sensors 114 and 214, for example, an accelerometer, a tilt sensor, a rotation sensor, a gyroscope, etc. may be used.

The motion sensors 114 and 214 may sense whether the user shakes or moves the remote control device, for example, the remote controller, and sense in which direction the remote controller is moved.

Because the display device 200 is fixed at a predetermined position, the motion sensors 114 and 214 are generally mounted in the remote control device 100 manipulated by the user.

The temperature sensors 115 and 215 measure heat of ambient air or an object and measure temperature. For the temperature sensors 115 and 215, various sensors to measure the external temperature, such as a platinum resistance temperature detector, a thermistor or a thermocouple, may be used.

The remote control device 100 or the display device 200 may sense whether the periphery of the display device 200, e.g., the room in which the display device 200 is located, is warm or cold using the temperature sensors 115 and 215.

In an embodiment of the present disclosure, the information collectors 110 and 210 of the remote control device 100 and the display device 200 may include face recognizers 117 and 216.

The face recognizer 117 or 216 recognizes a face from the image received from the camera 270 mounted in the remote control device 100 or the display device 200 and collects the situation information of the user.

In an embodiment of the present disclosure, the face recognizer 216 of the display device 200 first detects the face from the image received from the camera 270 and then detects feature points of the detected face, e.g., a pupil or a mouth corner. After the feature points are detected, the positions of the feature points and information about facial expression or the shape of the face based on the predefined positions of the feature points are compared to analyze the feature points and the situation information including face information and facial expression information of the face included in the image are generated.

In an embodiment of the present disclosure, the information collector 110 or 210 may include a pressure sensor 116.

The pressure sensor 116 measures pressure applied to the sensor. Examples of the pressure sensor include a conductive rubber sensor to measure pressure according to deformation of conductive rubber based on pressure applied to conductive rubber.

The pressure sensor 116 may include a pressure sensor using conductive rubber, a pressure sensitive polymer or a piezoelectric polymer according to a pressure sensing material and include a centralized pressure sensor or a distributed pressure sensor according to detection method.

The pressure sensor 116 may be generally mounted in the remote control device 100 which is frequently used by the user or may also be mounted in the display device 200 as necessary.

In an embodiment of the present disclosure, the second information collector 210 may further include the camera module 270.

The camera module 270 captures an external target. More specifically, the camera module 270 senses external visible light and converts the visible light into an electrical signal, thereby acquiring a fixed or moving image.

The image received through the camera module 270 is stored in the memory 250 of the display device 200 such that the face recognizer 217 recognizes the face or the image is displayed on the display unit 240 of the display device 200.

Although not shown, in an embodiment of the present disclosure, the information collector 110 or 210 of the remote control device 100 or the display device 200 may further include various sensors to collect a variety of situation information in addition to the above-described sensors 111 to 270.

For example, the information collector 110 or 210 may include an ultrasonic sensor (not shown) to sense ultrasonic waves.

The ultrasonic sensor irradiates inaudible ultrasonic waves to an external target and senses ultrasonic echo waves reflected from the target, thereby collecting information about presence of the target, the shape of the target or motion of the target.

The information collector 110 or 210 collects time information output from the processor of the remote control device 100 or the display device 200 or received from an external satellite and enables the controller 130 or 230 to generate the control command which varies according to when the situation information is collected.

The information collector 110 or 210 may collect information about content played back on the screen of the display device 200, that is, the display unit 240, such as program guide information (EPG). The EPG may be collected by receiving the EPG over a wired/wireless communication network or reading user log information from the memory of the remote control device 100 or the display device 200.

The user log information is meta information such as records indicating whether one piece of content is played back or data related thereto and includes, for example, history information such as the number of times that the user views the content, and the number of times that the user stops viewing the content or a last viewing time.

The situation information a1 of the user body state, e.g., presence of a user or an action of a user, and the situation information a2 of the surrounding environment, e.g., the amount of light, a temperature, a time, the number of persons around the display device 200, presence of an object between a user and the display device 200, a played-back program and a variety of information to estimate a user's emotional state, may be collected using the information collector 110 or 210.

As described above, the situation information a1 or a2 of the user body state or the surrounding environment collected by the information collector 110 or 210 is sent to the second situation determination unit 220 of the display device 200 as shown in FIG. 2 or the first situation determination unit 120 of the remote control device 100 as shown in FIG. 3a and is used by each device 100 or 200.

Hereinafter, the components of the embodiment of the present disclosure in which the situation determination unit and the controller are included in the display device 200 of the system will be described with reference to FIG. 3.

The information collector 110 or 210 shown in FIGS. 2 and 3 among the components of the display device 200 is described above. Hereinafter, in an embodiment of the present disclosure, the second situation determination unit 220 of the display device 200 will be described with reference to FIG. 3.

In an embodiment of the present disclosure, the second situation determination unit 220 determines the current state of the user based on the collected situation information a1 and a2 of the external environment and determines the current situation. That is, the second situation determination unit 220 determines the current state of the user and the feelings of the user using a plurality of pieces of situation information collected via the second information collector 210, e.g., the situation information a1 of the user body state such as the temperature and pulse of the user, the amount of light, sound volume, motion, user facial expression, information about a played-back program, or a current time.

At this time, the second situation determination unit 220 receives the situation information collected from the external environment, e.g., the amount of light, temperature, sound volume or the body state of the user as an input value and substitutes the input value into a predetermined situation determination algorithm to obtain a result value, and determines the current state of the user or the surrounding environment according to the result value.

In other words, the second situation determination unit 220 may determine the environment and state of the user.

For example, the second situation determination unit 220 may determine the amount of light sensed by the optical sensors 112 and 212, the volume of sound sensed by the acoustic sensors 113 and 213, whether the user is sleeping according to the biosignal 211 of the user, or in which environment the user is sleeping, such as whether the user is sleeping with the lights off, for example.

In order to enable the second situation determination unit 220 to determine the situation, a plurality of situation determination algorithms may be used according to the collected situation information and the determination information. Several pieces of situation information may be used as an input value of one algorithm or one piece of situation information may be used as an input value of the plurality of situation determination algorithms. In addition, individual situations are determined using several algorithms and the determined individual situations are aggregated to determine the overall situation of the remote control device 100 and the display device 200.

As in the above-described example, a determination as to whether the user is awake or sleeping is made from the biosignal of the user using a predetermined algorithm, a determination as to whether an illumination is turned on or off is made using the information about the amount of light, a current time or a time which has elapsed after the illumination is turned on is determined based on time information output from the processor, and then a determination as to whether the user does not go to sleep at night is made.

In an embodiment of the present disclosure, as shown in FIG. 2, the determination information database 221 for determination of the second situation determination unit 220 may be used.

The determination information database 221 stores determination information to determine the current state of the user based on the situation information.

The determination information refers to determination information when the situation information is within a predetermined range or has a predetermined value. For example, the determination information refers to information about the determination method according to the collected situation information, such as determining that the illumination is turned off if the amount of sensed light is within a predetermined range or determining that the user feels good if the user is smiling.

In this case, the second situation determination unit 220 searches the determination information database 221 for determination information corresponding to the situation information in association with the collected situation information a1 and a2. If the determination information corresponding to the situation information is present, a determination as to the current state of the user is made according to the determination information corresponding to the situation information. If determination information corresponding to the situation information is not present, the second situation determination unit 220 finishes the determination and waits until other situation information is collected.

According to the determination of the second situation determination unit 220, various user states and situation determination results of the surrounding environment, such as detection and recognition of the user, the number of persons located in front of the display device, various feelings of the user such as pleasure, happiness, gloom, sorrow, boredom, anger or fear, whether the user is sleeping or not, the intensity of illumination, or stress of the user.

The result determined by the second situation determination unit 220 is sent to the second controller 230 as shown in FIGS. 2 and 3 and the second controller 230 of the display device 200 generates and sends a control command corresponding to the determination result to a target to be controlled.

Hereinafter, in an embodiment of the present disclosure, the second controller 230 of the display device 200 will be described.

In an embodiment of the present disclosure, the second controller 230 of the display device 200 generates a control command to control the remote control device 100 and/or the display device 200, e.g., the display unit 240 or the image projector module such as the beam projector module 280 of the display device 200 according to the result of determining the current state based on the collected situation information. In addition, the second controller 230 may generate a control command to control the operations of the various components configuring the display device 200.

By controlling the display device 200, the display device 200 may provide the user with a service to stimulate a sense of the user based on the state or feeling of the user or the surrounding environment.

According to the embodiment of the present disclosure, the second controller 230 generates control information to control the remote control device 100 to output a predetermined notification signal according to the determination result and transmits the control information to the remote control device 100 as shown in FIG. 2. The control information may include information about the operation of the notification unit 140 of the remote control device 100, e.g., the pattern of light emitted from the light emitting module (151 of FIG. 3*a*) of the notification unit 140, information about the notification signal such as information about sound output from the acoustic output module 153 of the notification unit 140, etc. The notification unit 140 of the remote control device 100 operates according to the control information.

According to an embodiment of the present disclosure, the second controller 230 may transmit only the determination result to the remote control device 100. In this case, the remote control device 100 may determine a notification signal to be output based on the received determination result and control the notification unit 140, thereby outputting a notification signal such as predetermined light or sound.

In an embodiment of the present disclosure, the second controller 230 may generate a control command according to the determination result of the second situation determination unit 220 by referring to the control information database 231, as shown in FIG. 2.

The control information database 231 may store the control information of the remote control device 100 and/or the display device 200 corresponding to the current state of the user determined based on the situation information.

The control information may control the camera of the display device to capture an image if the collected situation information corresponds to a predetermined condition or control the display device to display the image captured by the camera of the display device in a picture-in-picture (PIP) manner. In addition, the control information may control a thumbnail image of at least one image captured by the camera of the display device to be regularly arranged on the screen of the display device or may control information related to the image displayed on the screen of the display device to be displayed on the screen of the display device.

The control information may include a variety of control information according to various types of services to stimulate the user's senses through the display device 200.

In an embodiment of the present disclosure, the second controller 230 searches the control information database 231 according to the current state of the user determined by the second situation determination unit 220, reads control information of the remote control device 100 and/or the display device 200 corresponding to the current situation if the control information is present in the control information database 231, and generates a control command corresponding thereto. Alternatively, if the control information of the remote control device 100 and/or the display device 200 corresponding to the current situation is not present, the second controller may finish generation of the control command and wait until other situation information is received from the second situation determination unit 220.

In an embodiment of the present disclosure, the second controller 230 may generate new control information according to a user command received through an input unit of the remote control device 100, e.g., various buttons (see 140 of FIG. 4A or 130*a* of FIG. 4B) arranged on the remote controller or correct already generated control information to generate new control information.

In particular, in this case, the input unit of the remote control device 100 may receive a user command from the user after the notification unit 140 outputs the notification signal to the user.

That is, if the user manipulates the remote control device 100 according to the notification information output from the notification unit 140, information about manipulation is transmitted to the second controller 230 of the display device 200 and the second controller 230 generates new control information corresponding thereto.

For example, upon determining that the user may not sleep for a long time at night based upon the situation information collected by the second controller 230, the second controller 230 may operate the projector module 280 of the display device 200 and project beams such that a constellation is displayed on the ceiling of the room of the user. At this time, when the user manipulates the remote control device 100 and inputs a command to stop the operation of the projector module 280, the second controller 230 may generate a new control command to stop the operation of the projector module 280 according to the input user command.

In addition, although, in an embodiment of the present disclosure, the second controller 230 may necessarily generate a control command according to the determination result of the second situation determination unit 220, the second controller 230 may randomly generate a control command corresponding to the determination result in an embodiment. In other words, the controller 230 may or may not generate the control command to control the remote control device 100 or the display device 200 even when the determination result of the situation determination unit 220 is the same.

Thus, the user may unexpectedly receive a service using the display device 200. Therefore, it may be possible to further stimulate the user's senses.

In an embodiment of the present disclosure, the display device 200 includes the display unit 240 to display various images received from an external device or stored in an internal memory according to the control command of the second controller 230.

In an embodiment of the present disclosure, the display device 200 may further include the memory 250 to store the above-described control command or a variety of information collected by an external device through an Internet network or an image captured through the camera 270 according to the above-described control command, e.g., a variety of meta information of an image played back through the display device 200. The data stored in the memory 250 may be retrieved by the second controller 230 and used for learning of the display device 200 as necessary and may be displayed through the display unit 240.

According to an embodiment of the present disclosure, the display device 200 may further include the update unit 260 to analyze a manipulation pattern of the user based on the information stored in the memory 250 and to update the control information database 231 based on the analyzed result.

The control information database 231 is established by a service provider who provides a service using the display device control system including the remote control device and does not include the individual characteristics of the users.

Accordingly, user manipulation, e.g., user manipulation through the input unit 150 of the remote control device 100, is statistically analyzed and a control command to control the display device 200 is updated according to user reaction or preference with respect to an individual situation. The control information database 231 is updated by the update unit 260.

In other words, the display device 200 learns how the display device 200 is controlled to provide a service according to user preference through the update unit 260.

In an embodiment of the present disclosure, the display device 200 may further include the camera module 270 to capture an external image. The camera module 270 may capture a still image and a moving image.

In an embodiment of the present disclosure, the display device 200 may further include the projector module 280 to project an image onto an external projection surface.

The projector module 280 projects light such as visible light or laser light onto an external projection surface, e.g., a screen, a wall or a ceiling to form a predetermined image on the projection surface.

Hereinafter, an example in which the remote control device 100 determines a situation and generates a control command will be described with reference to FIG. 4A.

FIG. 4A is a block diagram of a remote control device according to an embodiment of the present disclosure.

As shown in FIG. 4A, the remote control device according to an embodiment of the present disclosure may include the first information collector 110, the first situation determination unit 120, the first controller 130 and the notification unit 140. The first information collector 110 is described above.

The first situation determination unit 120 of the remote control device 100 determines the current state of the user based on the situation information collected by the first information collector 110 similarly to the second situation determination unit 220 of the display device 200.

According to an embodiment of the present disclosure, the first situation determination unit 120 may determine the current state of the user using only the first information collector 110 of the remote control device or receive the situation information collected by the second information collector 210 of the display device 200 to determine the current state of the user.

The determination result acquired by the first situation determination unit 120 of the remote control device is transmitted to the display device 200 according to an embodiment of the present disclosure such that the second controller 230 of the display device 200 generates a control command using the determination result.

According to an embodiment of the present disclosure, the determination result acquired by the first situation determination unit 120 of the remote control device is sent to the first controller 130 of the remote control device 100.

In an embodiment of the present disclosure, the remote control device 100 may further include the first controller 130 to generate a predetermined control command based on the determination result of the first situation determination unit 120.

The first controller 130 of the remote control device 100 generates a control command to control operation of the notification unit of the remote control device 100 according to the determination result and sends the control command to the notification unit 140. The first controller 130 of the remote control device 100 generates a control command to control the display device 200, e.g., a control command to drive the camera module 270 or the projector module 280, and send the control command to the display device 200.

As described above, if the display device 200 includes the second controller 230 and the second controller 230 generates a control command to control operation of the notification unit 140 of the remote control device 100 according to the determination result and sends the control command to the remote control device 100, the first controller 130 of the remote control device 100 need not generate the control command to control the notification unit 140.

As described above, if the second controller 230 of the display device 200 generates a control command of the display device 200, the first controller 130 of the remote control device 100 does not need to generate the control command of the display device 200.

For example, according to an embodiment of the present disclosure, the first controller 130 of the remote control device 100 generates a control command to control only the notification unit 140 of the remote control device 100 based on the result of determining the current state of the user using the situation information and sends the determination result to the display device 200 such that the second controller 230 of the display device 200 generates a control command to control the display device 200 based on the determination result.

As described with reference to FIG. 2, the controller 110 may refer to the control information database stored in the memory of the remote control device 100 or accessed by the remote control device 100 over a wireless communication network when generating the control command, according to the embodiment.

In an embodiment of the present disclosure, the remote control device 100 further includes the notification unit 140.

The notification unit serves to output a predetermined notification signal corresponding to the current state of the user determined by the first situation determination unit 120 of the remote control device 100 or the second situation determination unit 220 of the display device 200.

In other words, when the situation determination units 120 and 220 determine the state of the user and then the display device 200 is controlled according to the determination result, the user is informed that a new service is provided through the display device 200.

The notification unit may request the user to manipulate the input unit 150 of the remote control device 100 and to input a user command necessary to control the display device 200.

The notification unit 140 includes at least one of a light emitting module 141 to emit light, a vibration generation module 142 to vibrate the remote control device 100, and an acoustic output module 143 to output sound, in an embodiment of the present disclosure.

The light emitting module 141 controls a light source to emit predetermined light according to a light emitting control command received from the controller 130 or 230.

The light emitting module 141 includes a light source such as a light bulb using a filament mounted on an outer surface of the remote control device 100 or a light emitting diode (LED) using electroluminescence effect and a circuit to control the light source.

According to an embodiment of the present disclosure, the light emitting module 141 may emit light having a color or energy which is changed according to the result of determining the current state of the user using the situation information or may emit light in different patterns. For example, the color of emitted light or the flickering period of emitted light may be changed according to the determination result. The pattern of light may be changed according to the determination result. For example, red light is first flickered and yellow light is then flickered after a predetermined time or the pattern of light may be changed with time.

Accordingly, the user is intuitively aware of the determination result generated by the remote control device 100 or the display device 200 or how the display device 200 is controlled, through the pattern or form of light emitted from the light emitting module 141.

In an embodiment of the present disclosure, the color of a part or the entirety of the remote control device 100 may be changed according to operation of the light emitting unit 141.

According to an embodiment of the present disclosure, a part or the entirety of a housing of the remote control device 100 may be formed of a transparent or semi-transparent material to transmit light and the light emitting module 141 is placed on a lower side of a part or the entirety of the housing. If the amount or color of the light emitted from the light emitting module 141 is changed, the color of the part or the entirety of the remote control device 100 may be changed.

In the embodiment of the present disclosure, the light emitting module 141 may display different colors according to the state of the remote control device 100.

In a state in which the remote control device 100 is not driven or in a default state in which a predetermined control command is not sent from the remote control device 100 or the display device 200, the light emitting module 141 emits gray or black light or does not emit light such that the remote control device 100 appears gray or black.

If a predetermined control command is sent from the remote control device 100 or the display device 200, the light emitting module 141 emits light having another color, e.g., a delicate color having a low chrominance or brightness such that the color of the remote control device 100 is changed. The number of times that the color is changed is not limited to one and may be changed according to a predetermined pattern. The color to be changed may be randomly selected.

When a predetermined time, e.g., 3 to 4 seconds, has elapsed after the color of the remote control device 100 is changed, the display device 200 starts to be controlled.

After the control of the display device 200 is started, the light emitting module 141 of the remote control device 100 may continuously emit light having the same color until the control of the display device 200 is finished, according to an embodiment of the present disclosure. Accordingly, as long as the display device 200 is continuously controlled, the color of the remote control device 100 is maintained.

According to an embodiment of the present disclosure, when the control of the display device 200 is started or when a predetermined time has elapsed after the control of the display device 200 is started, the light emitting module 141 of the remote control device 100 may emit gray or black light or stop light emission. Then, the remote control device 100 is switched to the default state such that the color of the remote control device 100 becomes gray or black.

Accordingly, the user is intuitively aware of the determination result generated by the remote control device 100 or the display device 200 or how the display device 200 is controlled, through change in color of the remote control device 100.

The vibration generation module 142 generates vibrations with respect to the remote control device 100 according to the result determined using the situation information.

The vibration generation module 142 may vibrate the remote control device 100 using a vibration motor mounted in the remote control device 100, for example.

In the embodiment of the present disclosure, by changing the strength of vibrations or the vibration pattern of the remote control device 100 based on the determination result, the user may check the determination result and how the display device 200 is controlled.

The acoustic output module 143 outputs predetermined sound, music, or recorded voice to the user according to the result determined using the situation information.

In an embodiment of the present disclosure, the acoustic output module 143 receives an acoustic output control command from the first controller 130, selects at least one of a variety of acoustic data stored in the memory of the remote control device 100, such as voice data, music data, or sound data, according to the control command, and outputs the data through an output unit such as a speaker.

Accordingly, the user becomes aware the determination result or how the display device 200 is controlled, through voice, music, or sound.

In an embodiment of the present disclosure, the remote control device 100 may include the input unit 150 to receive a user command according to user manipulation and generate and send a control command corresponding thereto.

Figure 4B:
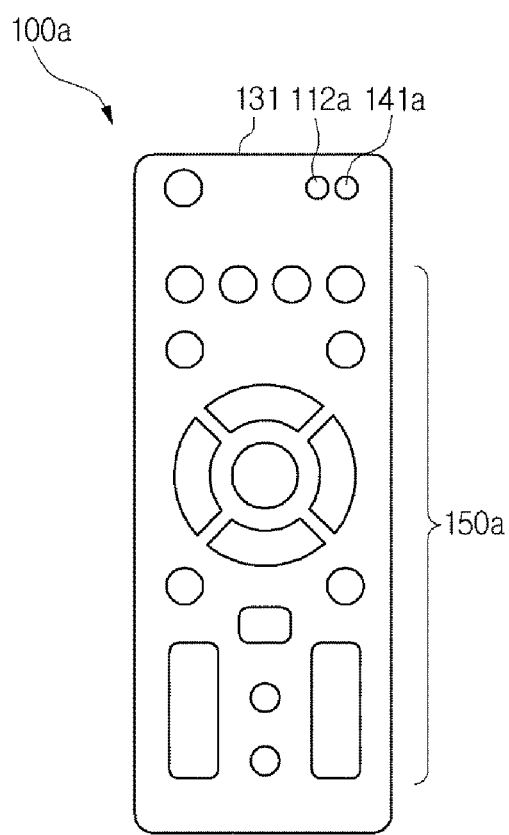
FIG. 4B is a front view of a remote control device according to an embodiment of the present disclosure.

The input unit 150 may include, for example, a plurality of buttons 140a placed on an outer surface of the remote control device 100 or a touchscreen on which virtual buttons are displayed, as shown in FIG. 4B and receive a command from the user through the buttons.

According to an embodiment of the present disclosure, after the notification unit 140 outputs a predetermined notification signal, the input unit 150 may receive a user command corresponding to a notification signal from the user. In other words, the input unit 150 is switched to a standby state to receive a command corresponding to the notification signal from the user after the output of the notification signal and generates an input command if the user manipulates the plurality of buttons 140a or the touchscreen of the input unit 150. The generated input command is sent to the controller 140 or the display device 200 such that the controller 140 or the display device 200 performs a next operation.

According to an embodiment of the present disclosure, the display device 200 may be controlled to perform predetermined operation even when the input unit 140 does not receive a user command.

An example of the remote control device 100 is shown in FIG. 4B.

FIG. 4B is a front view of a remote control device according to an embodiment of the present disclosure.

Referring to FIG. 4B, in an embodiment of the present disclosure, the remote control device 100 may be a remote controller 100a to control the display device 200.

The remote controller 100a includes a first information collector 110, e.g., an optical sensor 112a to sense light, and a notification unit 140, e.g., an LED module 141a to emit predetermined light to a user, as described above, in an embodiment of the present disclosure. The remote controller 100a may include a transmission unit to transmit a control command to the display device 200, e.g., an infrared irradiation unit 131. In addition, a plurality of buttons 150a to receive a predetermined command from the user may be placed on the outer surface of the remote controller.

As described above, in an embodiment of the present disclosure, the remote controller 100a measures the intensity of light through the optical sensor 112a to obtain situation information and sends the situation information to the situation determination unit 110 or 210 of the remote control device 100 or the display device 200. Then, the remote control device 100 or the display device generates the determination result based on the collected situation information and enables the LED module 141a of the remote controller 100a to output light having a predetermined color in a predetermined pattern to the user according to the determination result.

Thereafter, if the user presses any one of the plurality of buttons 150a of the remote controller 100a, a predetermined control command is generated by the input unit of the remote controller 100a and is transmitted to the display device 200 through the infrared irradiation unit 131. Then, the display device 200 performs operations corresponding to the transmitted control command.

Hereinafter, a system including a display device, a remote control device, and a server in an embodiment of the present disclosure will be described.

Figure 5:
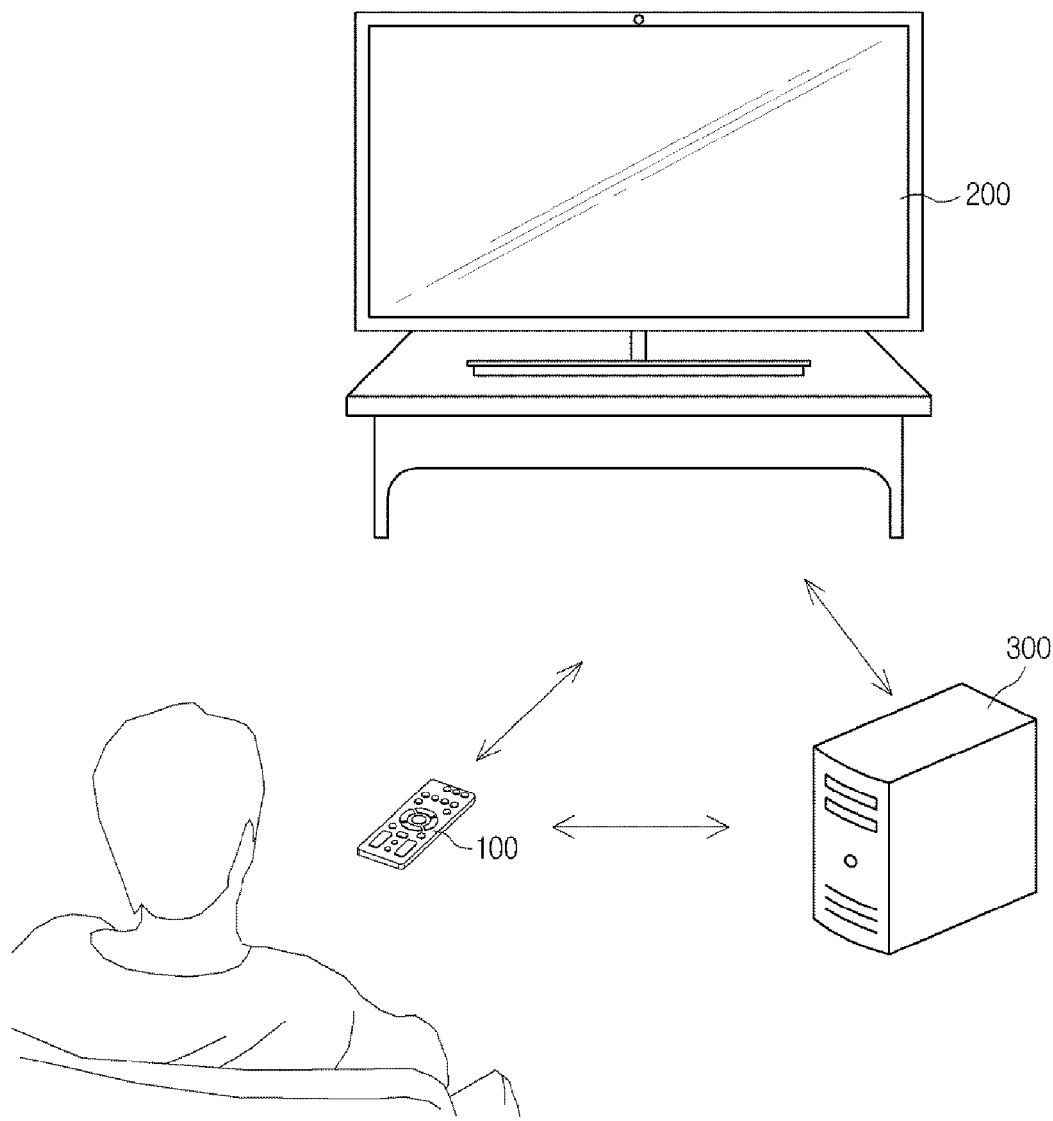
FIG. 5 is a diagram showing the configuration of a system including a display device, a remote control device and a server according to an embodiment of the present disclosure.
Figure 6:
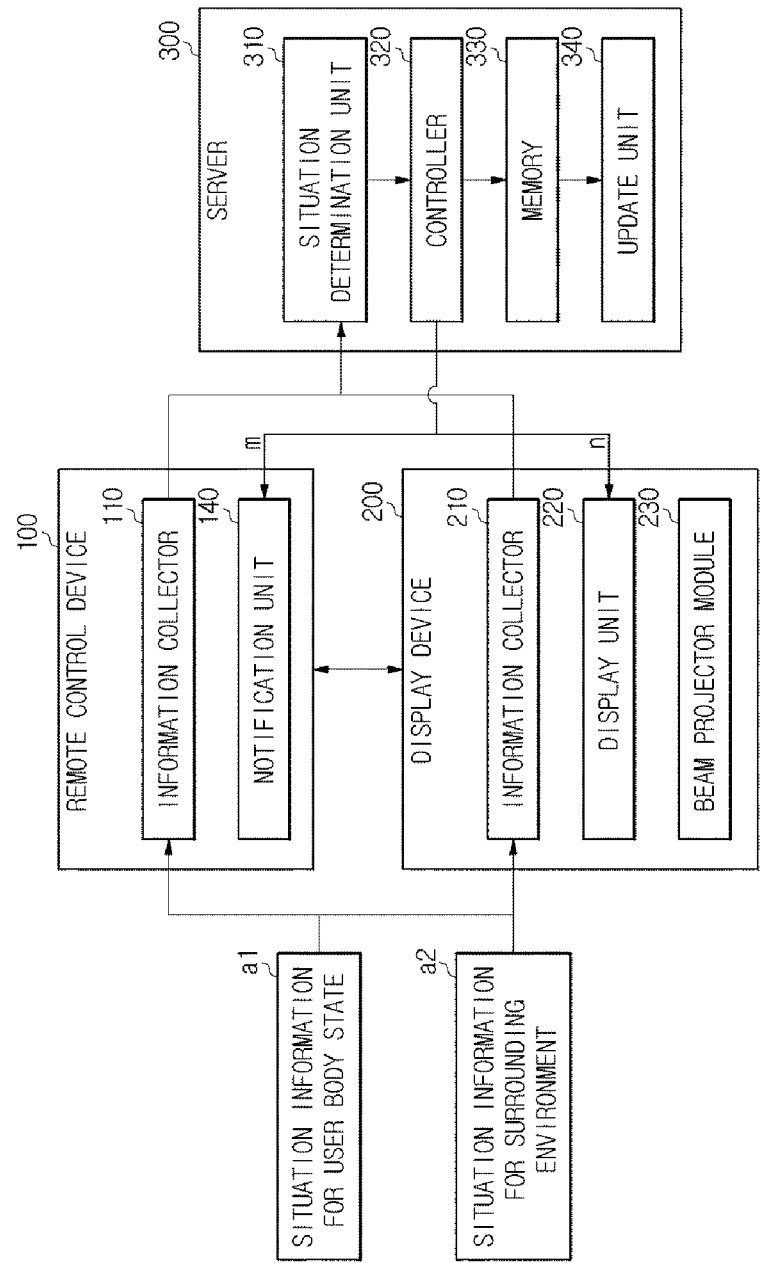
FIG. 6 is a block diagram of a display device, a remote control device, and a server according to an embodiment of the present disclosure.

FIG. 5 is a diagram showing the configuration of a system including a display device, a remote control device and a server according to an embodiment of the present disclosure, and FIG. 6 is a block diagram of a display device, a remote control device and a server according to an embodiment of the present disclosure.

As shown in FIGS. 5 and 6, in an embodiment of the present disclosure, the server 300 may be further included.

The server 300 receives the collected situation information from the remote control device 100 or the display device 200, determines the current state from the situation information, and generates a control command corresponding thereto.

According to an embodiment of the present disclosure, as shown in FIG. 6, the server 300 may include a situation determination unit 310 (hereinafter referred to as a third situation determination unit), a controller 320 (hereinafter referred to as a third controller), a memory 330, and an update unit 340.

In this case, as shown in FIG. 6, when the remote control device 100, the display device 200 or the remote control device 100 and the display device 200 collect situation information a1 and a2 through the information collectors 110 and 210, the collected information is transmitted to the server 300 over a wired/wireless communication network.

Then, the third situation determination unit 310 determines the situation using the collected situation information and sends the determination result to the third controller 320. The third controller 320 generates a control command based on the determination result and transmits the control command to the remote control device 100 and/or the display device 200.

According to an embodiment of the present disclosure, a control command m to control the notification unit 140 may be transmitted to the remote control device 100 and a control command n to control the display unit 220 or the projector module 230 may be transmitted to the display device 200. In other words, the control command transmitted from the server 300 to the remote control device 100 and the control command transmitted from the server 300 to the display device 200 may be different.

The other components of the remote control device 100, the display device 200, and the server 300 are substantially equal to the above-described components. The components may be partially modified according to the characteristics of the device.

Hereinafter, a method of controlling a display device based on a situation according to an embodiment of the present disclosure will be described with reference to FIGS. 7 to 11.

Figure 7:
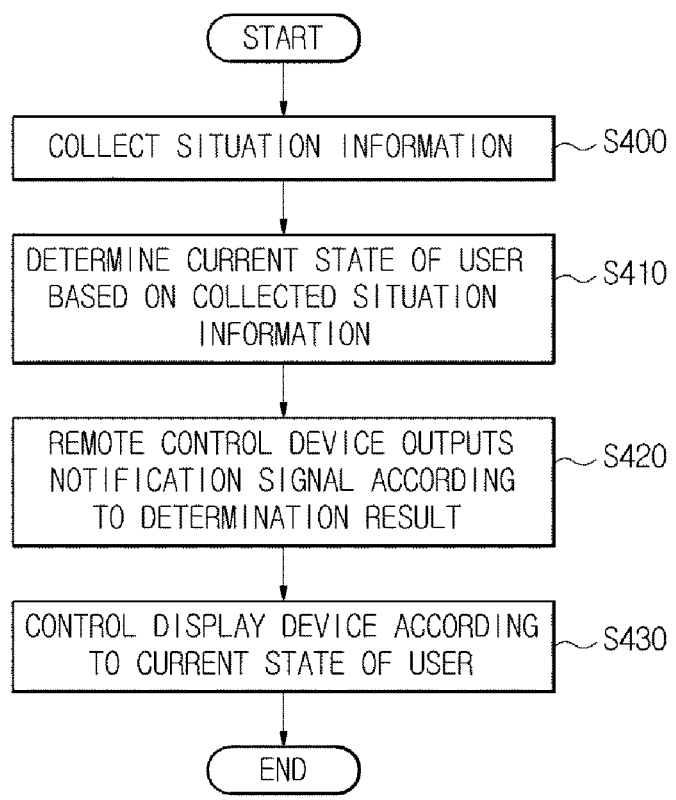
FIG. 7 is a flowchart illustrating a method of controlling a display device based on a situation according to an embodiment of the present disclosure.

FIG. 7 is a flowchart illustrating a method of controlling a display device based on a situation according to an embodiment of the present disclosure.

As shown in FIG. 7, according to an embodiment of the present disclosure, the method of controlling the display device based on the situation includes Operation S400 of collecting situation information, Operation S410 of determining the current state of the user, Operation S420 of outputting a notification signal at the remote control device 100 according to the determination result, and Operation S430 of controlling the display device 200 according to the current state of the user.

According to an embodiment of the present disclosure, in Operation S400 of collecting the situation information, the remote control device 100 or the display device 200 collects situation information of user body state or a surrounding environment through the information collector 110 or 210.

For example, various sensors of the remote control device 100 or the display device 200 recognize facial expression, a point of gaze, or voice of the user located a predetermined distance from the display device 200 to recognize the body state or tone of the user or detect user motion or pressure of the remote control device 100 applied by the user, thereby acquiring the situation information.

The information collector 110 or 210 of the remote control device 100 or the display device 200 may collect situation information while the user uses or does not use the display device 200. The situation information of the user and the surrounding environment may be collected continuously, periodically, or arbitrarily.

The current state of the user may be determined based on the collected situation information (operation S410).

In this case, the current state of the user may be determined by searching the previously stored determination information database 221 for information corresponding to the collected situation information or substituting the situation information into the previously stored situation determination algorithm.

Therefore, it may be possible to determine emotional and body state of the user.

In an embodiment of the present disclosure, a process of determining the feelings of the user or the surrounding environment will be described.

In order to determine the feelings of the user, first, the facial expression of the user is recognized using the camera and the face recognizers 117 and 216 of the display device 200 or the remote control device 100, user voice is collected using the acoustic sensors 113 and 213, e.g., a microphone, the feelings of the user are determined based on the collected situation information, and the determination result is generated. The determination result refers to various feelings of the user, e.g., pleasure, gloom, anger, etc.

In order to detect whether the user is sleeping or not, the situation information of the user state and the surrounding environment is obtained through the biosignal sensor 111 or 211, the temperature sensor 115 or 215 and the camera 270 of the remote control device 100 or the display device 200. In this case, in order to increase accuracy of the determination as to whether the user is sleeping or not, the time information output from the controller 130 or 230 or information about the intensity of the light sensed by the optical sensor 212 may be further used.

If the situation is determined, the remote control device 100 outputs the notification signal according to the determination result (operation S420).

The notification signal may be light emitted from the light emitting module 141 of the remote control device 100, vibration of the remote control device 100 through the vibration module 141 or voice, sound, or music output from the acoustic output module 143.

The notification signal may be displayed to the user by changing the color of the remote control device 100 as described above. That is, in the remote control device 100 having the housing, a part or the entirety of which is formed of a transparent or semi-transparent material to transmit light, the light emitting module 141 emits predetermined light to the part or the entirety of the housing to change the color of the part or the entirety of the remote control device 100. The user recognizes that the color of the part or the entirety of the remote control device 100 is changed.

After the notification signal is output, the display device 200 is controlled according to the current state of the user (operation S430).

If the user is excited while viewing a sports game through the display device 200, the situation information is collected and it is determined that the user state is excitement and the camera 270 of the display device 200 captures the image of the rejoicing user and the captured image is stored in the memory 250. In this case, the image displayed through the display device 200 and the image of the user may be combined and displayed in a PIP manner.

If the user is bored, the image captured by the camera of the display device or the image edited in the PIP manner may be controlled to be displayed. In this case, if many captured images of the user are present, a thumbnail image may be extracted from the images of the user, be regularly arranged and displayed on the screen of the display device.

While the user views video content such as a movie or drama through the display device 200, the user may control a variety of image information related to the image displayed on the screen 240 of the display device 200, e.g., main character information, ratings, keyword, background information, etc. at a predetermined position of the display device. In this case, prior to display of the image information, a selection button may be displayed on the screen in order to receive a selection command from the user. Even if the user views content first or a plurality of times, the same operation may be performed according to log information.

In addition, if the user views the same video content through the display device a plurality of times, e.g., three times or more, the image displayed by the display device 200 may be controlled to be automatically stored.

Hereinafter, various examples of the method of controlling the display device based on situation will be described.

Figure 8:
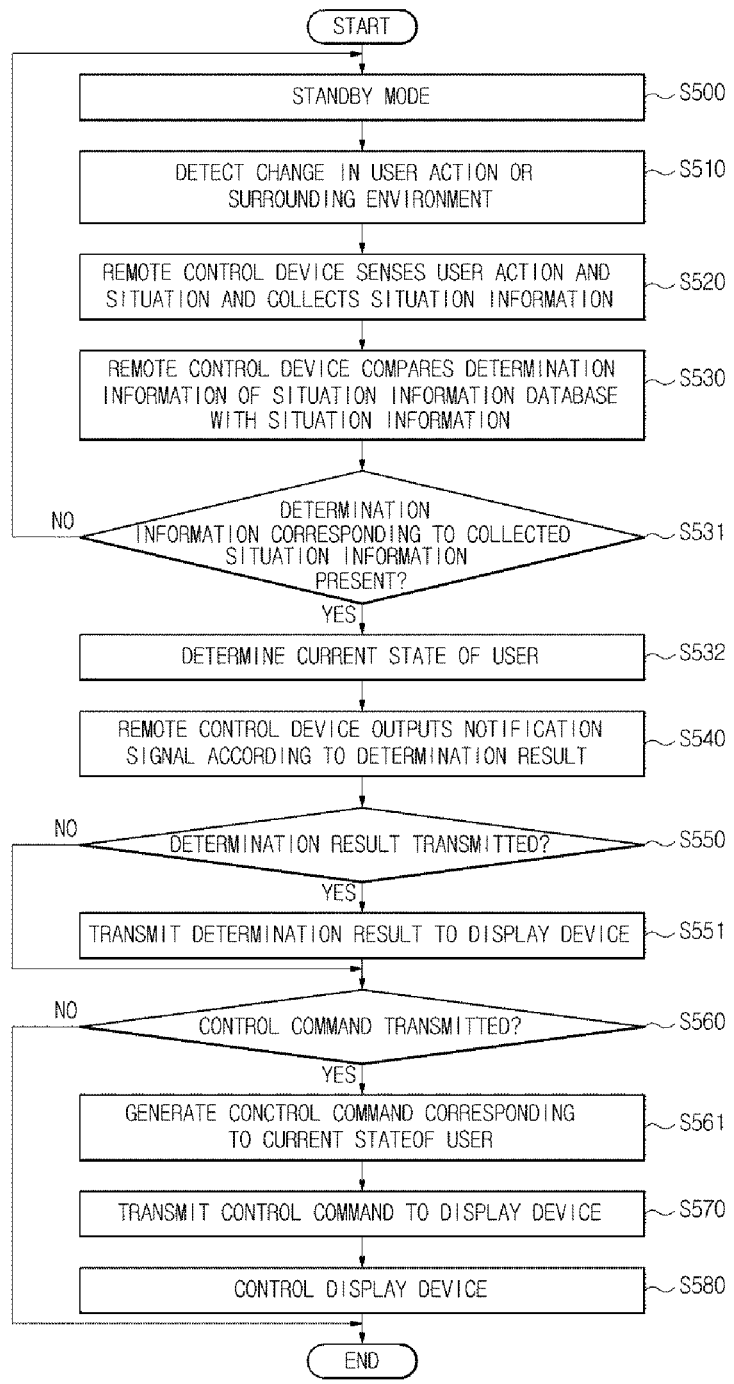
FIG. 8 is a flowchart illustrating a method of controlling a display device based on a situation according to an embodiment of the present disclosure.

FIG. 8 is a flowchart illustrating a method of controlling a display device based on situation according to an embodiment of the present disclosure.

As shown in FIG. 8, the method of controlling the display device based on the situation may be performed as follows.

The remote control device 100 or the display device 200 operates in a standby mode for the method of controlling the display device based on the situation (operation S500). At this time, the display device 200 may display predetermined video content and the remote control device 100 may control the display device 200 according to user manipulation to change the channel of the display device 200 or control volume.

For example, a user action or a surrounding environment is changed, that is, the pulse or respiratory rate of the user is changed or the intensity of light of the room is increased or decreased, or predetermined video content start to be played back. Alternatively, the user may manipulate the input button of the remote control device 100 or the display device 200 such that the remote control device 100 or the display device 200 collects the situation information (operation S510).

Then, the remote control device 100 or the display device 200 starts to collect the situation information (operation S520). That is, if the pulse or respiratory rate of the user is changed, predetermined video content is played back or the user inputs a situation information collection command, the information collector 110 or 210 of the remote control device 100 or the display device 200 starts to collect the situation information.

According to the embodiment of the present disclosure, the remote control device 100 or the display device 200 may continuously collect situation information regardless of user action or manipulation or change in surrounding environment. In this case, the standby mode for the method of controlling the display device based on the situation is not necessary.

If the situation information is collected, the first controller 130 of the remote control device 100 compares the situation information collected by the remote control device 100 or the display device 200 with the determination information of the determination information database (operation S530) to determine whether determination information corresponding to the collected situation information is present.

If determination information corresponding to the collected situation information is not present (operation S531), the remote control device 100 may be switched to the standby mode operation S500 again or may collect the situation information of the user action or the surrounding environment (operation S520).

If determination information corresponding to the collected situation information is present, the current state of the user, e.g., pleasure, happiness, gloom, sorrow, boredom, anger or fear, is determined (operation S532).

Then, the first controller 130 of the remote control device 100 generates a predetermined control command according to the determination result. At this time, one control command is used to control the notification unit 140.

The remote control device outputs the notification signal according to the control command to control the notification unit 140 (operation S540). For example, the light emitting module 141 may emit light or the acoustic output module 142 such as a speaker may output voice or sound. As described above, the color of the part or the entirety of the remote control device 100 may be changed.

A determination as to whether the determination result is transmitted to the display device 200 is made (operation S550). If the second controller 230 of the display device 200 generates a control command to control the display device 200 according to the determination result, the determination result needs to be transmitted to the display device 200 in order to generate the control command (operation S551). Such transmission may be performed through a wireless communication network such as a Bluetooth or Wi-Fi network.

The remote control device 100 generates a control command corresponding to the determination result.

According to the embodiment of the present disclosure, the remote control device 100 may receive a user command from the user through the input unit 150 after the notification unit 140 outputs the notification signal.

The user becomes aware that the display device 200 may be controlled by a separate control command through the notification signal. In other words, the user becomes aware that a service provided using the display device 200 is present.

Thereafter, a determination as to whether the user receives the service, that is, whether the display device 200 is desired to be driven according to predetermined operation by the control information database 231, how the display device 200 operates or which operation among a predetermined scheduled operations is selected and performed is made.

If the user manipulates the remote control device 100, that is, presses a predetermined button 150*a*, the first controller 130 of the remote control device 100 generates a control command according to user manipulation.

In an embodiment of the present disclosure, the notification signal may be output without receiving a command from the user and a control command may be automatically generated before the notification signal is output or when a short time has elapsed after the notification signal is output.

If the control command is not generated, for example, if all control commands are generated by the controller 230 or 320 of the display device 200 or the server, operation of the remote control device 100 is finished (operation S560).

If the control command is generated (operation S560), a control command corresponding to the current state of the user according to the determination result is generated. This control command is used to control operation of the display device 200 as described above. Such a control command may be a control command to manipulate the camera 270 of the display device 200 to capture the image of the user or a control command to manipulate the beam projector module 280 in order to project a beam onto a projection surface to generate a predetermined image (operation S561).

The control command generated by the remote control device 100 is transmitted to the display device 200 (operation S570) and the display device 200 operates according to the control command (operation S580).

Figure 9:
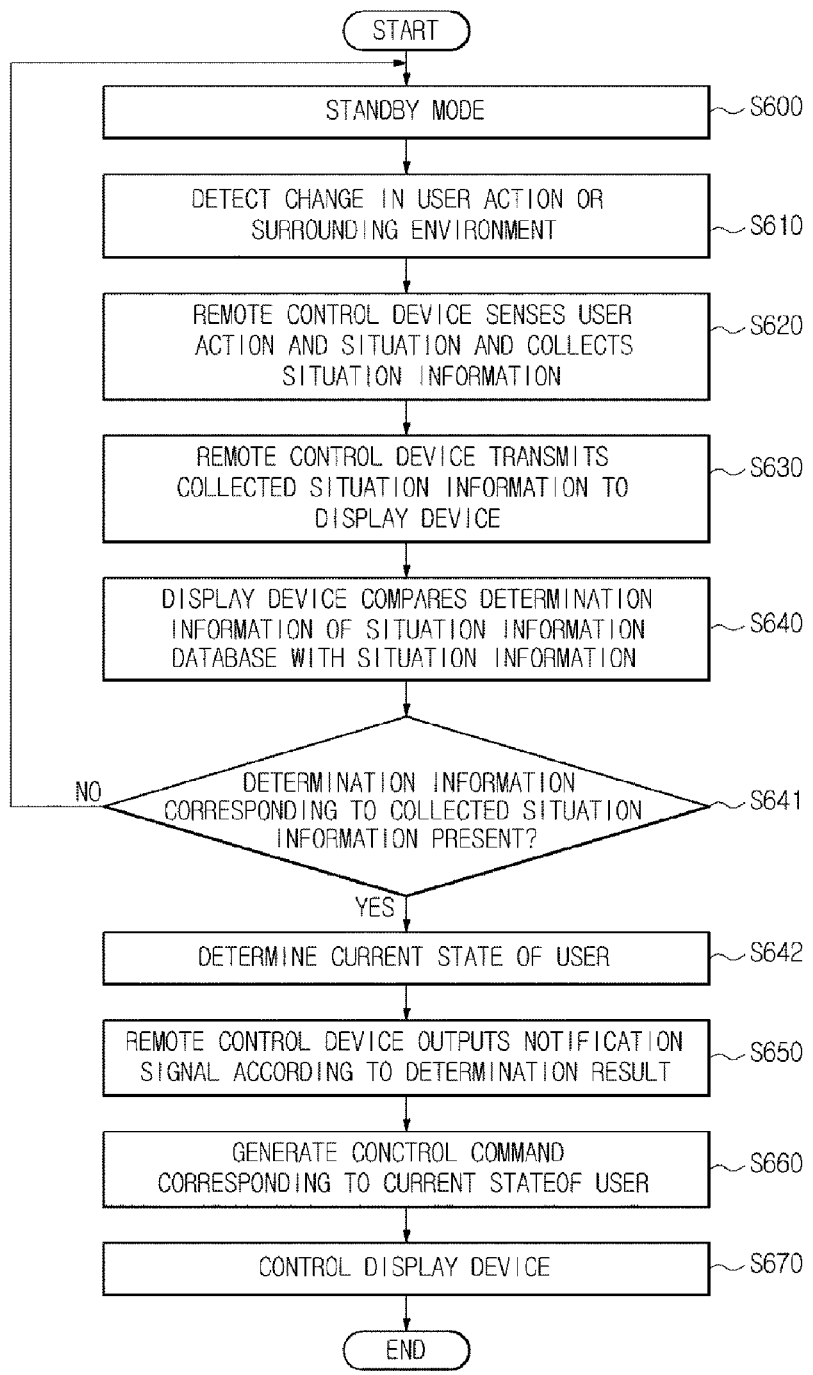
FIG. 9 is a flowchart illustrating a method of controlling a display device based on a situation according to an embodiment of the present disclosure.

FIG. 9 is a flowchart illustrating a method of controlling a display device based on situation according to an embodiment of the present disclosure.

As shown in FIG. 9, the method of controlling the display device based on situation according to an embodiment of the present disclosure may be performed as follows.

When the remote control device 100 and the display device 200 are in a standby mode (operation S600), if the user action or surrounding environment is changed (operation S610), the remote control device 100 and/or the display device 200 senses the user action or the surrounding environment and collects situation information (operation S620).

Thereafter, the remote control device 100 transmits the collected situation information to the display device 200 using a wireless communication network using various mobile communication standards, such as Bluetooth, Wi-Fi, 3GPP, 3GPP2, or WiMax (operation S630).

The display device 200 determines the current state of the user using the situation information collected by the remote control device 100.

According to an embodiment of the present disclosure, the display device 200 may use the situation information collected by the remote control device 100 or the situation information collected by the second information collector 210 of the display device 200. In other words, a combination of the situation information collected by the remote control device 100 and the situation information collected by the display device 200 may be used or only the situation information collected by any one of the devices 100 and 200 may be selectively used.

In an embodiment of the present disclosure, the display device 200 compares the determination information of the determination information database with the collected situation information to determine the current state, by referring to the determination information database 221 (operation S640).

In this case, if determination information corresponding to the collected situation information is present in the determination information database 221, the current state of the user may be determined (operation S641 and operation S642). If determination information corresponding to the collected situation information is not detected, the remote control device 100 or the display device 200 may be switched to the standby mode to generate the control command according to the situation information.

If the current state of the user is determined, the second controller 230 of the display device 200 sends the control command to output the notification signal to the remote control device 100 according to the determination result. At this time, a wireless communication network using various mobile communication standards, such as Bluetooth, Wi-Fi, 3GPP, 3GPP2, or WiMax may be used to transmit the control command. Then, the remote control device 100 outputs the notification signal according to the control command to output the notification signal (operation S650).

The second controller 230 of the display device 200 generates a control command to control the display device 200 in correspondence with the current state of the user (operation S660).

According to an embodiment of the present disclosure, such control commands may be sequentially generated before or after the remote control device 100 outputs the notification signal through the notification unit 140 of the light emitting module 141 such as the LED module without a command received from an external device.

According to an embodiment of the present disclosure, the remote control device 100 may output the notification signal through the notification unit 140, the user manipulates the input unit 150 of the remote control device 100 to receive the user command, and then the control command may be generated according to the user command.

For example, if the LED module of the remote control device 100 emits light in a predetermined pattern, it may be possible to inquire as to whether the user wishes to drive the display device 200 according to predetermined operation by the control information database 231, that is, whether the user wishes to receive a service through voice simultaneously or sequentially output to the user or text displayed on the screen of the display device 200. At this time, the user may manipulate the button 150a of the remote control device 100 to determine whether the service is received from the display device 200 or how a part of the display device 200 is driven while the service is provided.

The display device 200 is controlled automatically by the display device 200 or according to a control command generated by manipulating the remote control device 100 by the user. For example, the display device 200 may capture and display an image of a user or display a played-back video on a screen along with a previously captured image in a PIP manner. In addition, the beam project module of the display device 200 may be driven (operation S670).

Figure 10:
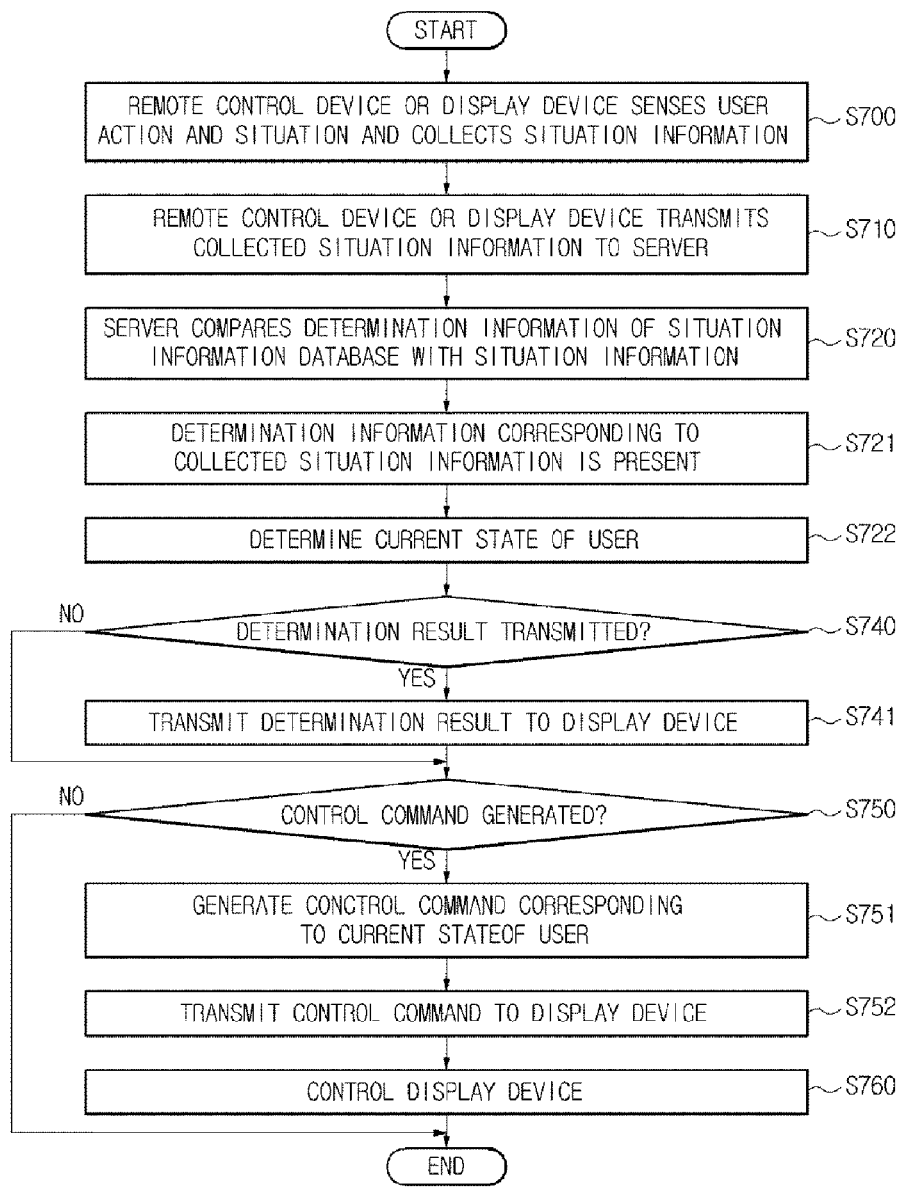
FIG. 10 is a flowchart illustrating a method of controlling a display device based on a situation according to an embodiment of the present disclosure.

FIG. 10 is a flowchart illustrating a method of controlling a display device based on situation according to an embodiment of the present disclosure.

As shown in FIG. 10, an embodiment of the method of controlling the display device based on situation will be described.

First, as described above, the remote control device 100 or the display device 200 senses the action or situation of the user and collects situation information (operation S700).

The situation information collected by the remote control device 100 or the display device 200 is transmitted to the server 300 shown in FIG. 5 over a wired/wireless communication network (operation S710).

Then, the server 300 determines the current situation using the situation information collected by the remote control device 100 or the display device 200. In this case, according to an embodiment of the present disclosure, the determination information database 221 established in the server 300 or connected to the server 300 over the wired/wireless communication network is searched, the situation information and the determination information are compared and the determination information corresponding to the situation information is read (operation S720 and operation S721).

The current state of the user is determined based on the read determination information to generate a determination result (operation S722).

The server 300 transmits the determination result to the remote control device 100 (operation S730) and the remote control device 100 receives the determination result and outputs the notification signal corresponding to the determination result (operation S731).

According to the embodiment of the present disclosure, the server 300 may simultaneously or sequentially transmit the determination result to the remote control device 100 and the display device 200 (operation S740 and operation S741).

If the determination result is transmitted to the display device 200 ("Yes" of operation S740), the display device 200 generates a control command based on the determination result. In this case, the server 300 does not generate the control command ("No" of operation S750). At this time, the second controller 230 of the display device 200 generates the control command corresponding to the current state of the user to control the display device 200 as in operation S660 of FIG. 9.

If the determination result is not transmitted to the display device 200 ("No" of operation S740 and "Yes" of operation S750), the server 300 generates the control command according to the determination result (operation S751). According to the embodiments of the present disclosure, the control information database 231 established in the server 300 or connected to the server over the wired/wireless communication network may be referred to when generating the control command.

Thereafter, the generated control command is transmitted to the display device 200 (operation S752) and the display device 200 is controlled to provide a service to the user according to the control command generated by the server (operation S760).

Figure 11:
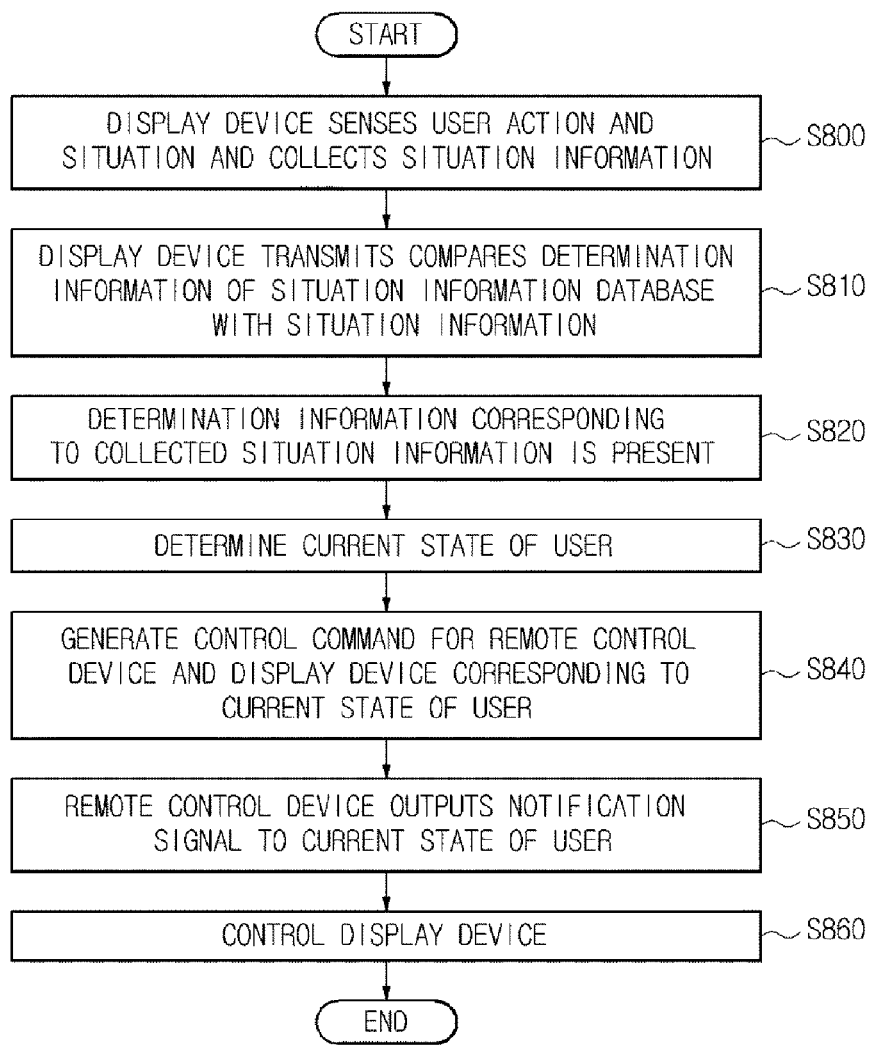
FIG. 11 is a flowchart illustrating a method of controlling a display device based on a situation according to an embodiment of the present disclosure.

FIG. 11 is a flowchart illustrating a method of controlling a display device based on situation according to an embodiment of the present disclosure.

As shown in FIG. 11, an embodiment of the method of controlling the display device based on the situation will be described.

As shown in FIG. 11, in an embodiment of the present disclosure, only the second information collector 210 of the display device 200 may collect situation information (operation S800). For example, the face recognizer 216 of the second information collector 210 of the display device 200 acquires face information or facial expression information from the face of the user located in front of the display device 200.

Then, the display device 200 compares the determination information of the determination information database 221 with the collected situation information, e.g., the face information or facial expression information (operation S810).

If the determination information corresponding to the collected situation information is present in the determination information database 221 (operation S820), the current state of the user is determined based on the determination information (operation S830).

Then, the display device generates a control command of the remote control device 100 corresponding to the current state and a control command of the display device 200 (operation S840).

The control command of the remote control device 100 is transmitted to the remote control device 100 in order to control the notification unit 140 of the remote control device 100 and the remote control device outputs the notification signal corresponding to the current state of the user according to the control command (operation S850).

The display device 200 is controlled based on the control command of the display device 200 (operation S860). For example, if it is determined the user is smiling as the result of determining the facial expression information of the user, an image received during a predetermined time or an image of at one moment in the facial image of the user is stored and processed to generate an image file of the user's face, thereby capturing the image of the user's face.

Hereinafter, various embodiments of a service provided to a user by controlling the display device according to the method of controlling the display device based on situation will be described with reference to FIGS. 12 to 15.

Figure 12:
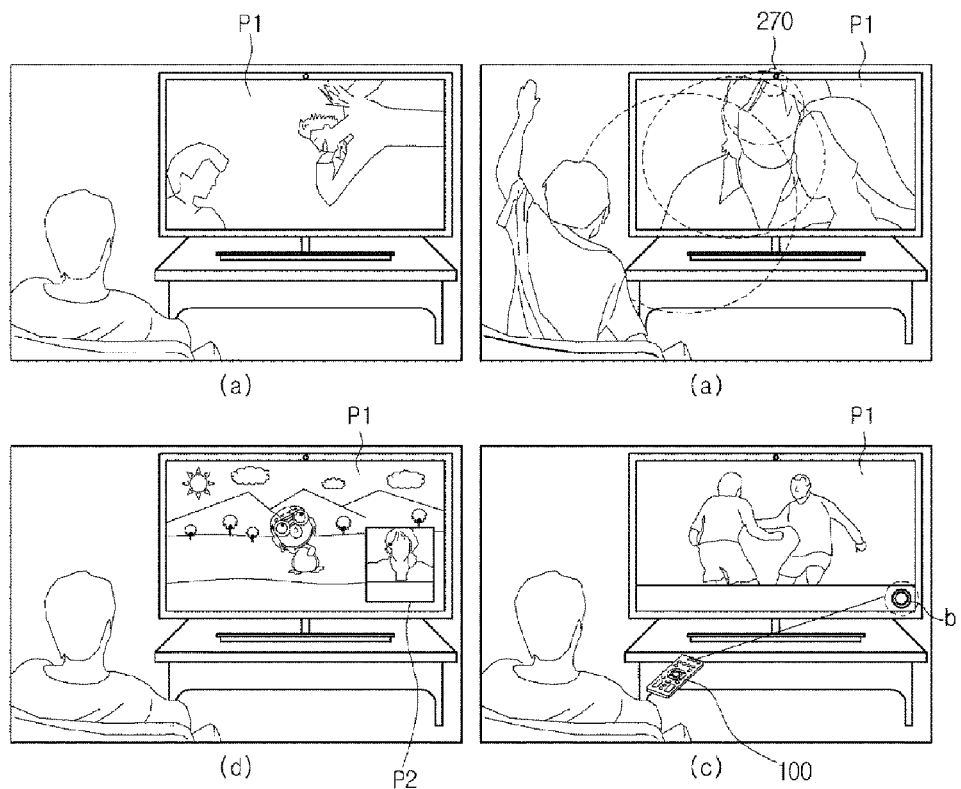
FIG. 12 is a diagram illustrating a state in which a display device is controlled according to a method of controlling the display device based on a situation according to an embodiment of the present disclosure.

FIG. 12 is a diagram illustrating a state in which a display device is controlled according to a method of controlling the display device based on a situation according to an embodiment of the present disclosure.

The user is viewing at a video such as a sports game or drama through a display screen p1 (FIG. 12(a)). In this case, the remote control device 100 and the display device 200 may collect situation information through the information collectors 110 and 210.

If the user is excited as shown in FIG. 12(b), biological information such as the pulse or respiratory rate of the user is collected through the biosignal sensors 111 and 211, a scream of the user is sensed through the acoustic sensor 113 to collect acoustic information, and user actions are sensed through the optical sensor 112 to collect user action information.

If the situation determination unit 120, 220 or 310 determines that the user is excited based on the collected information, first, the remote control device 100 outputs a notification signal. The camera module 270 of the display device is driven to film the moving image of the user after the user manipulates the remote control device 100 or without manipulating the remote control device 100. The filmed moving image is stored in the memory 250.

Thereafter, a selection button is displayed at the lower side of the played-back image p1 under a predetermined situation (FIG. 12(c)).

The predetermined situation may follow previously stored settings such as when a predetermined time has elapsed after the moving image is filmed or when video content of the same genre is viewed.

The predetermined situation may be a situation that the user wishes to view the recorded image again, e.g., a situation that it is determined that the user is gloomy, based on the result determined based on the situation collected by the first situation determination unit 120. In order to determine the situation, the above-described method of controlling the display device based on the situation may be performed. In this case, the control command of the display device 200 is to display the selection button at the lower side of the played image p1.

Thereafter, the moving image p2 stored by manipulating the remote control device 100 by the user is displayed along with the currently played-back video content p1 in a PIP manner. In this case, information about the played-back video, e.g., program guide information, may be simultaneously displayed as a subtitle (FIG. 12(d)).

Accordingly, the present disclosure may control the display device 200 to provide a service to stimulate user's senses. Thus, the user may view the image of the user who views the sports game or drama after a predetermined time or according to their mood or feels positive emotions while remembering when viewing the sports game or drama.

Figure 13:
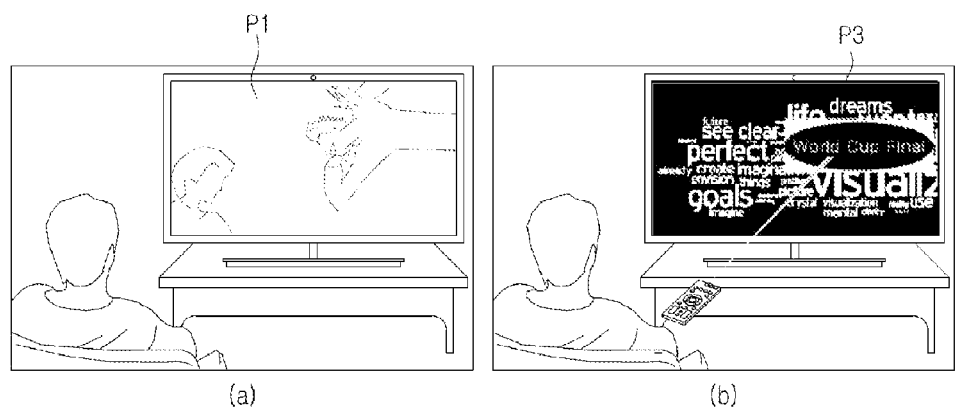
FIG. 13 is a diagram illustrating a state in which a display device is controlled according to a method of controlling the display device based on a situation according to an embodiment of the present disclosure.

FIG. 13 is a diagram illustrating a state in which a display device is controlled according to a method of controlling a display device based on a situation according to an embodiment of the present disclosure.

As shown in FIG. 13, in the method of controlling the display device based on the situation according to an embodiment of the present disclosure, if the situation determination unit 120, 220, or 310 determines that the video content p1 viewed by the user has been repeatedly viewed while viewing the video content p1 via the TV, the program guide information of the played-back video content and the viewing time may be stored.

The title of the content stored according to user selection may be displayed on the screen of the display device 200 (p1). In this case, the size of the title of the content may be changed according to the number of times that the user views the content or the viewing frequency. For example, if the number of times that the user views the content or the viewing frequency is large, the size of the title may be large and, if the number of times that the user views the content or the viewing frequency is small, the size of the title may be small (FIG. 13(b)).

At this time, the user manipulates the remote control device 100 to select any one title and the display device 200 plays the video corresponding to the selected title back on the display screen, thereby rapidly providing the user with the video having a high frequency of viewing.

Figure 14:
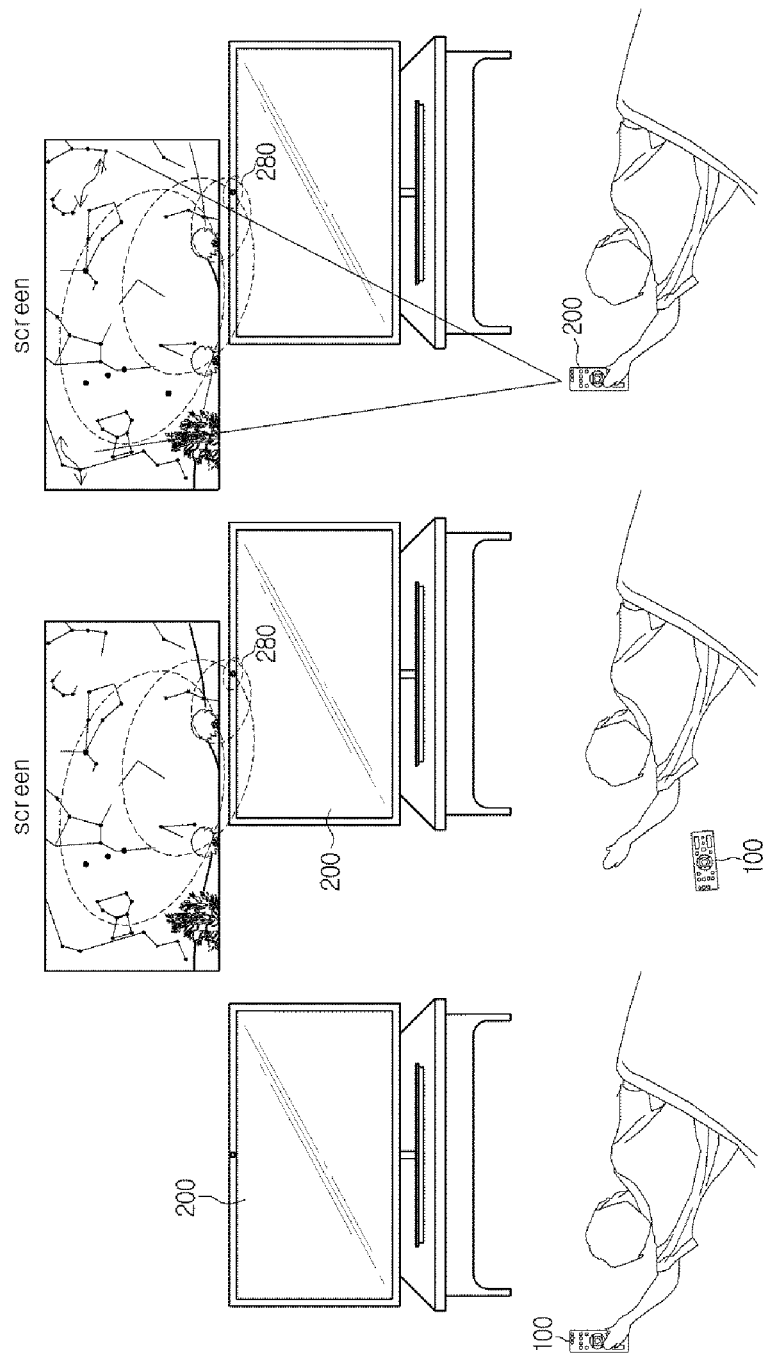
FIG. 14 is a diagram illustrating a state in which a display device is controlled according to a method of controlling the display device based on a situation according to an embodiment of the present disclosure.

FIG. 14 is a diagram illustrating a state in which a display device is controlled according to a method of controlling a display device based on situation according to an embodiment of the present disclosure.

As shown in FIG. 14, the user may not sleep at night.

At this time, according to an embodiment of the present disclosure, the remote control device 100 or the display device 200 collects situation information a1 of a user body state and situation information a2 of a surrounding environment. At this time, the situation information a1 of the user body state indicates that the user is awake but is stationary and the situation information a2 of the surrounding environment indicates that the intensity of light is equal to or less than a predetermined level, the time of day is night, e.g., 12 am, and a period of time when the intensity of light is equal to or less than the predetermined level exceeds 30 minutes.

The remote control device 100 or the display device 200 determines that the user does not go to sleep for a long time at night based on such situation information and generates a control command to control the remote control device 100 and the display device 200. In particular, the control command to control the display device 200 includes a control command to control driving of the beam projector module 280.

The remote control device 100 outputs a notification signal for a predetermined time according to the generated control command. At this time, a part or the entirety of the remote control device 100 emits light having a soft color using the light emitting module. In this case, the remote control device 100 may not receive an additional command from the user. In other words, the display device 200 may be automatically controlled without manipulating the remote control device 100 by the user, as described with reference to FIG. 11.

Thereafter, the beam projector module 280 of the display device 200 projects a beam onto a projection surface, e.g., a ceiling, and displays constellations, a night sky, video content such as a movie or drama, a past image of the user, etc. on the projection surface, e.g., the ceiling.

Thereafter, the user may move the remote control device 100 in a predetermined pattern or manipulate the input unit 150 of the remote control device 100 to move the image projected on the projection surface such as the ceiling. In this case, the motion sensor 114 of the remote control device may be used to determine how the remote control device 100 is moved. In other words, when the user moves or rotates vertically or horizontally in a state in which the remote control device 100 is directed to the projected image, the motion sensor 114 senses and converts such movement or rotation into an electrical signal and thus the first controller 130 of the remote control device 100 or the second controller 230 of the display device 200 controls the beam projector module 280 such that the image projected onto the projection surface is changed according to movement of the remote control device 130.

Thereafter, the situation collector 110 and 210 of the remote control device 100 or the display device 200 collects the situation information of the user continuously or at predetermined frequency. If it is determined that the user is sleeping as the result of determining the collected situation information, a control command of the beam projector module 280 is generated to stop operation of the beam projector module 280.

Accordingly, if the user does not easily go to sleep at night, constellation or a past image of the user may be displayed on the projection surface through the beam projector module 280 to enable the user to go to sleep soundly. In addition, it may be possible to prevent the display device 200 and, more particularly, the projector module 280 from meaninglessly operating.

In an embodiment of the present disclosure, the facial expression of the user located near the image display may be recognized such that the display device 200 captures the image of the user, which will be described in greater detail with reference to FIG. 15.

Figure 15:
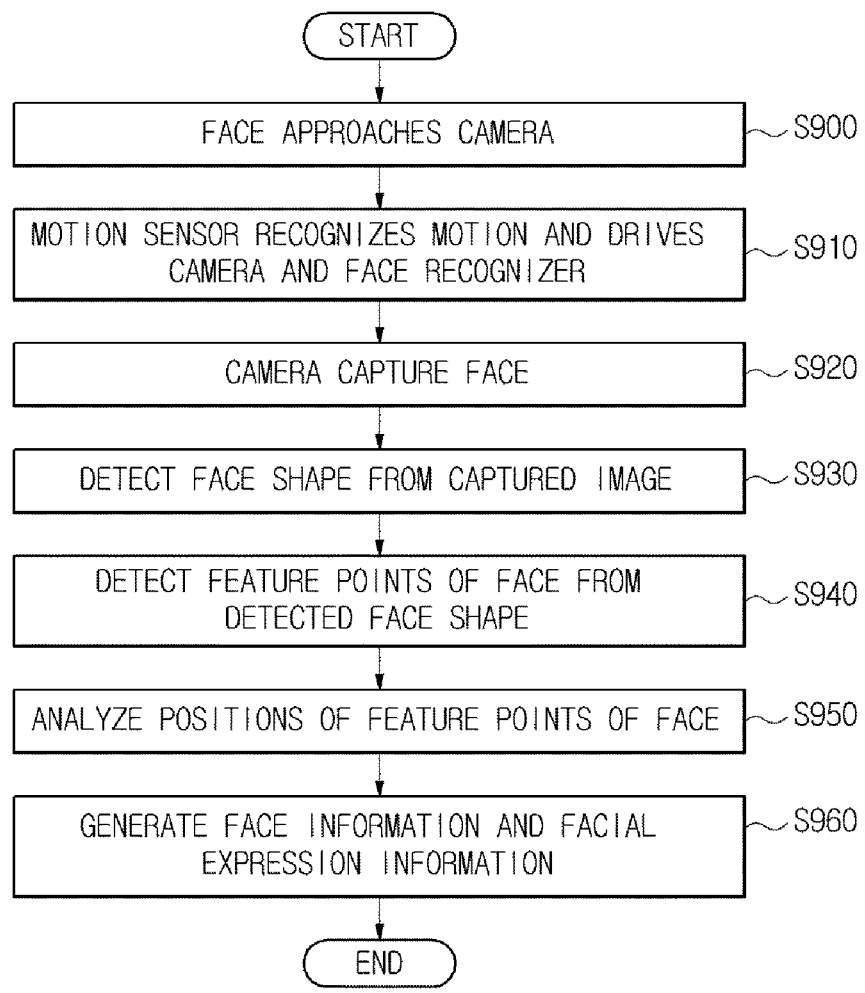
FIG. 15 is a flowchart illustrating a method of recognizing a user's face and controlling a display device according to an embodiment of the present disclosure.

FIG. 15 is a diagram illustrating a process of collecting situation information such as face information and facial expression information in a method of recognizing a user's face and controlling a display device according to an embodiment of the present disclosure.

Referring to FIG. 15, the process of acquiring the face information and the facial expression information will now be described.

According to an embodiment of the present disclosure, first, the user and, more particularly, the face of the user approaches the camera 270. At this time, a plurality of users may be present (operation S900). Then, the optical sensor 212 of the display device 200 recognizes approaching of a person and drives the camera 270 and the face recognizer 216 (operation S910).

According to an embodiment of the present disclosure, the camera 270 and the face recognizer 216 may start to operate according to user manipulation without sensing approach of the user.

The camera 270 captures the image of the user's face and obtains temporary image data including the face of at least one user, as the at least user's face approaches (operation S920).

Thereafter, a face is detected from the captured image, that is, the generated image data (operation S930). According to the embodiment of the present disclosure, light and shade or a skin color is identified and pixels thereof are extracted to detect a portion corresponding to a face or extracted pixels are combined and compared with data of the face shapes of a plurality of persons to detect a face from the captured image.

A feature point of the face, such as a pupil or a mouth corner, is detected from the detected face (operation S940). In this case, the feature point may be detected from the face based on the shape of the feature point.

The position of the feature point of the face is compared with data of the face of the previously stored user or person to determine or analyze to whose face the detected face corresponds or the facial expression (operation S950) and face information and facial expression information are generated according to the determination result (operation S960).

If the second situation determination unit 210 determines that the user is smiling based on the generated face information and facial expression information, the second controller 220 controls the camera 270 to capture the image of the user according to the determination result, converts data obtained by capturing the image of the user into an image file, and stores the data in a separate memory.

Although not shown, according to the embodiment of the present disclosure, the remote control device 100 outputs a predetermined notification signal according to the result of determining the situation and controls the display device such that information about a program is displayed at the lower side of the screen of the display device 200. In this case, the information displayed on the lower side of the screen may be information collected through a web or program guide information transmitted along with the image.

The user may experience various services provided by controlling the display device 200 based on the situation. The display device 200 may provide one or a plurality of services. The service may be changed according to a period of time when the user uses the display device or the frequency of use thereof.

For example, the display device 200 is controlled such that a user action is initially recorded to generate a moving image or the user records the frequency or time of using video content. At this time, when the user does not go to sleep at night, the display device 200 may be controlled to display constellations on a ceiling as described above.

Thereafter, after a predetermined time has elapsed, the recorded user action is played back or a variety of information about a program which is viewed again, e.g., program guide information or ratings information may be provided.

According to an embodiment of the present disclosure, the control content of the display device 200 or the result of determining the situation may be recorded and may be arbitrarily searched by the user after a predetermined period, e.g., 99 days, has elapsed. At this time, the recorded content may be displayed on the display screen in the form of a user interface such as a diary. Then, the user may confirm their emotional state and how the display device 200 is controlled.

As described above, in the present disclosure, in controlling the display device to provide a service, the service may be arbitrarily or randomly provided to the user according to the state of the user or as necessary. Then, the user receives an unexpected service to stimulate the user's senses. Accordingly, the user obtains positive emotional effect through the display device.

According to the present disclosure, by providing a display device, a remote control device to control the display device and a method of controlling the display device based on situation, it may be possible to control the display device based on a current state of a person or an environment, such as feelings or actions of a user who uses a display device or surrounding environments.

It may be possible to provide a user with various sense-based services suitable for feelings of the user and the surrounding environments based on a current state of a user.

It may be possible to acquire a variety of state information to determine body states or feelings of a user from feelings or actions of the user or external environments to accurately determine the state or feelings of the user and to appropriately control the display device according the state of the user.

It may be possible to appropriately control the display device according to the state of the user to efficiently stimulate the user's senses, and to enable the user to be subjected to user's experience based on the states, actions or feelings of the user. Therefore, the user feels positive emotions through the display device.

It may be possible to provide a variety of content or services which may arouse various emotions based on the feelings or actions of the user.

It may be possible to enable the display device to learn and improve content or services to stimulate user's senses according to user's reaction or preference. Therefore, the user may receive optimal content or services.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A display device comprising:
a wireless communicator configured to transmit and receive a command or data with a remote control device;
a situation determination unit configured to determine a current state of a user based on at least one piece of situation information received from the remote control device using the wireless communicator or collected by an information collector; and
a controller configured to generate control information to provide a sense-based image service to the user according to the current state of the user by transmitting and receiving a command or data with the remote control device using the wireless communicator,
wherein the remote control device outputs a notification signal, and is able to transmit a user command after outputting the notification signal, and
wherein the controller generates the control information after the controller receives the user command from the remote control device.

2. The display device according to claim 1, further comprising a determination information database to store determination information to determine the current state of the user based on the situation information,
wherein the situation determination unit searches the determination information database for determination information corresponding to the situation information and determines the current state of the user based on the determination information corresponding to the situation information if the determination information corresponding to the situation information is present.

3. The display device according to claim 1, further comprising a control information database comprising control information of the remote control device or the display device corresponding to the current state of the user.

4. The display device according to claim 3, wherein the controller detects the control information of the display device corresponding to the current state of the user by referring to the control information database and controls the display device according to the detected control information.

5. The display device according to claim 1, wherein the controller corrects the generated control information according to the user command, and generates new control information.

6. The display device according to claim 5, further comprising:
a memory to store the new control information generated by the controller; and
an update unit to analyze a user manipulation pattern based on the stored control information and to update the control information database based on the analyzed result.

7. The display device according to claim 1, wherein the information collector comprises at least one of an optical sensor to sense light, an acoustic sensor to sense sound, a motion sensor to sense motion, a temperature sensor to sense a temperature, and a biosignal sensor to sense at least one of temperature, pulse, respiratory rate, and heart rate of a person.

8. The display device according to claim 1, wherein the information collector comprises a face recognizer to detect a face shape from an image, to detect feature points of a face from the detected face shape, to analyze the positions of the feature points of the face, to generate face information and facial expression information, and to collect situation information.

9. The display device according to claim 1, wherein the notification unit comprises at least one of a light emitting module to emit light, a vibration generation module to generate vibrations, and an acoustic output module to output sound.

10. The display device according to claim 1, wherein the control information to control the display device performs at least one of:
controlling a camera of the display device to capture an image,
controlling the image captured by the camera of the display device to be displayed on the display device in a picture-in-picture (PIP) manner,
controlling a thumbnail image of at least one image captured by the camera of the display device to be displayed on a screen of the display device, and
controlling information about an image displayed on the screen of the display device to be displayed on the screen of the display device.

11. The display device according to claim 1, further comprising a beam projector module to project an image onto an external projection surface.

12. The display device according to claim 1, wherein the situation determination unit aggregates situation information and image information of an image played back by the display device and determines the current state of the user.

13. A remote control device comprising:
a wireless communicator configured to receive a command or data regarding a current state of a user determined based on situation information collected from a display device;
a notification unit configured to output a notification signal corresponding to the received current state of the user based on the command or data received by the wireless communicator; and
a controller configured to be able to transmit a user command to the display device using the wireless communicator after the notification unit outputs the notification signal,
wherein, after the display device receives the user command, the display device generates control information to provide a sense-based image service to the user according to the current state of the user.

* * * * *